I nited States Patent

(12) United States Patent
Aljundi et al.

(10) Patent No.: US 11,827,538 B2
(45) Date of Patent: Nov. 28, 2023

(54) SYSTEM AND METHOD FOR HYBRID DESALINATION AND CRYSTALLIZATION OF SEAWATER USING LASER INDUCED SHOCK WAVE NUCLEATION

(71) Applicant: King Fahd University of Petroleum and Minerals, Dhahran (SA)

(72) Inventors: Isam H. Aljundi, Dhahran (SA); Watheq Al-Basheer, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 17/689,514

(22) Filed: Mar. 8, 2022

(65) Prior Publication Data

US 2023/0286835 A1 Sep. 14, 2023

(51) Int. Cl.
*C02F 1/04* (2023.01)
*C02F 1/30* (2023.01)
*C02F 1/44* (2023.01)
*C02F 103/08* (2006.01)
*C02F 1/10* (2023.01)
*C02F 9/00* (2023.01)

(52) U.S. Cl.
CPC ............... *C02F 1/441* (2013.01); *C02F 1/043* (2013.01); *C02F 1/10* (2013.01); *C02F 1/30* (2013.01); *C02F 9/00* (2013.01); *C02F 2103/08* (2013.01)

(58) Field of Classification Search
CPC ..... C02F 1/30; C02F 1/441; C02F 2001/5218
See application file for complete search history.

(56) References Cited

U.S. PATENT DOCUMENTS

2017/0036923 A1  2/2017  Cioanta et al.
2023/0065608 A1* 3/2023  Sparrow .............. B01D 69/125

FOREIGN PATENT DOCUMENTS

CN          105439351 A        3/2016

OTHER PUBLICATIONS

Sivakumar, et al.; Shock-wave-induced nucleation leading to crystallization in water; Journal of Applied Crystallography; Jul. 2, 2019; 6 Pages.
Mirsaleh-Kohan, et al.; Laser Shock-Wave Induced Crystallization; Crystal Growth & Design; Jan. 3, 2017; 20 Pages.

* cited by examiner

*Primary Examiner* — Bradley R Spies
(74) *Attorney, Agent, or Firm* — Oblon, McClelland, Maier & Neustadt, L.L.P.

(57) ABSTRACT

A hybrid system and a method for hybrid desalination and crystallization of seawater is provided. The hybrid system includes a reverse osmosis unit configured to separate the seawater from dissolved solids, generate a first quantity of purified water, and generate a second quantity of wastewater. The hybrid system also includes a pressure exchanger configured to lower a pressure of the second quantity of wastewater to atmospheric pressure. The hybrid system further includes a laser induced shock wave crystallizer configured to trigger nucleation of the dissolved salts in the second quantity of wastewater, expel a third quantity of wastewater having a second concentration of dissolved salts, and expel a fourth quantity of salt crystals. The hybrid system also includes a collection vat for receiving the salt crystals. The hybrid system further includes a high pressure pump configured to recycle the third quantity of wastewater back to the reverse osmosis unit.

20 Claims, 11 Drawing Sheets

800A

800C

SYSTEM AND METHOD FOR HYBRID DESALINATION AND CRYSTALLIZATION OF SEAWATER USING LASER INDUCED SHOCK WAVE NUCLEATION

TECHNICAL FIELD

The present disclosure is directed to wastewater purification systems and methods for hybrid desalination-crystallization of wastewater based on laser induced shock wave nucleation.

DESCRIPTION OF RELATED ART

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Due to rapid growth in global population, pollution of fresh water reservoirs, and climate change, demand for fresh water may be expected to grow rapidly in the future. Approximately 90% of developing nations are affected by water scarcity, which may increase fourfold in the next 25 years [See: H.-J. Lee, M.-K. Hong, S.-D. Han, S.-H. Cho, S.-H. Moon, "Fouling of an anion exchange membrane in the electrodialysis desalination process in the presence of organic foulants", Desalination, 238 (2009) 60-69]. This water scarcity may be an alert to petrochemical industries that are associated with water-intensive production processes [See: S. Munirasu, M. A. Haija, F. Banat, "Use of membrane technology for oil field and refinery produced water treatment—a review", Process Saf. Environ. Prot., 100 (2016) 183-202]. The petrochemical industries produce large volumes of wastewater with high Total Dissolved Solids (TDS) that cannot be sent for industrial disposal without reducing the TDS, in order to meet stringent regulations (<3000 ppm). Industrial practice in some petrochemical plants includes dilution of effluent wastewater with large volumes of pure water (volumes as high as seven times the volume of effluent). The inability of conventional water treatment processes to separate pure water from high TDS wastewater has stimulated the industries to look for alternative solutions to treat wastewater while meeting production requirements [See: Carla Denize Venzke, Alexandre Giacobbo et al, "Increasing water recovery rate of membrane hybrid process on the petrochemical wastewater treatment", Process Safety and Environmental Protection 117 (2018) 152-158].

Seawater desalination plants working at a recovery level of 50%, produce a high TDS waste stream of 70,000 ppm, referred to as reject brine. Disposal of a high TDS waste stream is technologically challenging and generates increased disposal costs. In the past, the reject brine was expelled into the sea. However, there is a growing concern about the environmental impact and the effect on the marine life from this concentrated reject brine. The high TDS waste stream may undergo a Zero Liquid Discharge (ZLD) process [See: Thomas A. Davis, "Zero Discharge Seawater Desalination: Integrating the Production of Freshwater, Salt, Magnesium, and Bromine", University of South Carolina Research Foundation, Report 111, 2006], which separates the salts completely from water. As the amount of reject brine from desalination plants is considerable, recovery of salts has become a feasible solution. [See: Ibrahim Al-Mutaz, "By-product recovery from Saudi desalination plants", Desalination 64 (1987) 97-110].

To achieve ZLD seawater desalination, the following steps are necessary: desalination, concentration of the brine, and salt crystallization. Seawater reverse osmosis (RO) has proven to be an energy efficient and low cost method of desalinating seawater and producing freshwater [See: N. Ghaffour, T. M. Missimer, G. L. Amy, "Technical review and evaluation of the economics of water desalination: current and future challenges for better water supply sustainability", Desalination 309 (2013) 197-207]. Crystallization technology is characterized by recovering valuable salts along with high quality water, a high recovery rate, without consumption of chemicals or other materials [See: H. Lu et al., "Crystallization techniques in wastewater treatment: An overview of applications", Chemosphere 173 (2017) 474-484]. Furthermore, a crystallization device may be very efficient, energy saving and easy to scale up when appropriately designed [See: Al-Mutaz, I., Wazeer, I., "Comparative performance evaluation of conventional multi-effect evaporation desalination processes". Appl. Therm. Eng. 73 (2014) 1194-1203]. Crystallization techniques include evaporation, cooling, reaction, and membrane distillation crystallization. Conventional crystallization technology uses multi-effect evaporators. [See: H. W. Chung, K. G. Nayar, J. Swaminathan, K. M. Chehayeb, J. H. Lienhard, "Thermodynamic analysis of brine management methods: zero-discharge desalination and salinity-gradient power production", Desalination 404 (2017) 291-303].

Hybridizing the desalination process with other technologies, such as power generation, has been proposed in order to lower production costs, minimize energy consumption, and to prevent scale formation. However, disclosure of hybrid devices which combine a desalination process with other technologies in order to produce both fresh water and salt is limited. For example, Hayashi et al. [See: Y. Hayashi, S. Fukui, Y. Nakamura, U.S. Pat. No. 6,030,535: "Method of and apparatus for producing potable water and salt", 2000] proposed combining an electrodialysis unit having an evaporator with the desalination unit to produce pure water and salt from seawater". Ohya et al. [See: H. Ohya, T. Suzuki, S. Nakao, "Integrated system for complete usage of components in seawater", Desalination 134 (1-3) (2001) 29-36] described an integrated system that combines reverse osmosis, nanofiltration, multi-ion exchange units, an evaporator, and electrodialysis unit for producing salts and minerals along with pure water.

Further, U.S. Patent Publication No. 20170036923 described a system for removing contaminants from liquid, which uses a reverse osmosis membrane in conjunction with acoustic pressure shock waves devices. The acoustic pressure shock waves devices may use one or more laser sources. The acoustic pressure shock waves devices may be arranged along a surface of the reverse osmosis membrane, to prevent clogging thereof due to salt accumulation in its pores. The system produces heavy brine water but does not provide any technique for separation of the salt crystals from the heavy brine water and uses the shock wave crystallizer as a pressure source to de-clog the reverse osmosis membrane.

CN105439351 described an integrated seawater desalination and salt formation apparatus. The sea water is forced into a reverse osmosis unit, and pressure is exchanged in a pulsation energy exchanger. Pure water was collected and the remainder, at lower pressure, was passed into a spray saltwater crystallizer which evaporates the water and crystallizes the salt. The pulsation energy exchanger is used to generate stable high pressure seawater and the reference does not mention a laser induced shock wave crystallizer.

Further, "Shock-wave-induced nucleation leading to crystallization in water" [A. Sivakumar, Dhas, S. A. M. J. Appl. Cryst. (2019). 52, 1016-1021] discussed laser shock wave crystallization of seawater in a basic experiment. Similarly, a document titled "Laser Shock Wave Induced Crystallization" (Mirsaleh-Kohan et al., Cryst. Growth Des. 2017, 17, 2, 576-581, Jan. 3, 2017) described a laser shock wave crystallizer built in a simple laboratory experiment. The simple experimental devices of Sivakumar and Mirsaleh-Kohan do not mention a hybrid system for purifying wastewater which combines a reverse osmosis unit with a laser induced shock wave crystallizer.

As such, none of the references describe the hybridization of a desalination unit with a laser induced shock wave crystallizer capable of producing fresh water and valuable salts and minerals.

Accordingly, it is an object of the present disclosure to provide a system and methods for hybrid desalination and crystallization of wastewater using laser induced shock wave nucleation to recover salts.

SUMMARY

In an exemplary embodiment, a hybrid desalination and crystallization system for purifying seawater is provided. The hybrid desalination and crystallization system includes a reverse osmosis unit configured to separate the seawater from dissolved solids, generate a first quantity of purified water, and generate a second quantity of wastewater having a first concentration of dissolved salts. The hybrid desalination and crystallization system also includes a pressure exchanger configured to lower a pressure of the second quantity of wastewater to atmospheric pressure. The hybrid desalination and crystallization system further includes a laser induced shock wave crystallizer configured to trigger nucleation of the dissolved salts in the second quantity of wastewater, expel a third quantity of wastewater having a second concentration of dissolved salts, and expel a fourth quantity of salt crystals. Herein, the second concentration is less than the first concentration. The hybrid desalination and crystallization system also includes a collection vat for receiving the salt crystals, and a high pressure pump configured to recycle the third quantity of wastewater back to the reverse osmosis unit.

In some embodiments, the hybrid desalination and crystallization system further includes a reservoir of treated seawater, and a reservoir pipe configured to connect the reservoir with a first pipe leading to an inlet of the high pressure pump.

In some embodiments, the hybrid desalination and crystallization system further includes at least three membrane vessels located in the reverse osmosis unit. Each membrane vessel has an input port, a first output port configured to expel the first quantity of purified water, and a second output port configured to expel the second quantity of wastewater having the first concentration of dissolved salts. The hybrid desalination and crystallization system further includes a first manifold connected to a second pipe connected to an outlet of the high pressure pump and to the input port of each membrane vessel. The hybrid desalination and crystallization system further includes a second manifold connected to the second output port of each membrane vessel.

In some embodiments, the hybrid desalination and crystallization system further includes a booster pump connected to the pressure exchanger. The booster pump has a booster pump inlet and a booster pump outlet. The hybrid desalination and crystallization system further includes a third pipe configured to connect the booster pump outlet to the second pipe.

In some embodiments, the hybrid desalination and crystallization system further includes a first pressure exchanger input port connected to the first pipe, a second pressure exchanger input port connected to a fourth pipe connected to the second manifold, a first pressure exchanger output port and a second pressure exchanger output port. The hybrid desalination and crystallization system also includes a fifth pipe connected between the second pressure exchanger output port and a laser induced shock wave crystallizer input port, a sixth pipe connected between the booster pump inlet and the first pressure exchanger output port, and a seventh pipe connected to an output port of the laser induced shock wave crystallizer.

In some embodiments, the hybrid desalination and crystallization system further includes a check valve connected between the seventh pipe and the reservoir pipe. The check valve is configured to prevent the treated seawater in the reservoir pipe from flowing into the seventh pipe.

In some embodiments, the hybrid desalination and crystallization system further includes a first pressure in the first pipe, and a second pressure in the fourth pipe, wherein the second pressure is greater than the first pressure. The hybrid desalination and crystallization system further includes a first duct in the pressure exchanger connected between the first pressure exchanger input port and the first pressure exchanger output port. The pressure exchanger is configured to receive the treated seawater at the first pressure at the first pressure exchanger input port from the first pipe and expel the treated seawater at a third pressure from the first pressure exchanger output port. The hybrid desalination and crystallization system further includes a second duct in the pressure exchanger connected between the second pressure exchanger input port and the second pressure exchanger output port. The pressure exchanger is configured to receive the second quantity of wastewater at the second pressure at the second pressure exchanger input port from the fourth pipe and expel the second quantity of wastewater at atmospheric pressure at the second pressure exchanger output port, wherein the first duct is parallel to the second duct.

In some embodiments, the hybrid desalination and crystallization system further includes a reservoir intake port configured to receive untreated seawater. The reservoir intake port includes a sieve configured to remove large particles from the untreated seawater, where the large particles have a diameter greater than 0.0001 microns. The hybrid desalination and crystallization system also includes a chemical input port configured to inject chemicals including water softeners, acid, and anti-scalants into the untreated seawater in the reservoir to generate the treated seawater. The hybrid desalination and crystallization system also includes a recirculating chiller configured to control the temperature of the treated seawater to 23±1° C.

In some embodiments, the hybrid desalination and crystallization system further includes a laser configured to emit pulses of coherent light. The hybrid desalination and crystallization system further includes a reflective concentric mirror located on an outer surface of the laser induced shock wave crystallizer. The reflective concentric mirror has a central aperture. The concave interior of the reflective concentric mirror has a mirror-like surface. The central aperture is configured to collimate coherent light entering the central aperture at an angle to the aperture to minimize direct reflection through the aperture to the surrounding environment. The pulses of coherent light generate acoustic shock waves in the second quantity of concentrated wastewater, where the acoustic shock waves trigger nucleation of salt in the concentrated wastewater.

In another exemplary embodiment, a method for hybrid desalination and crystallization of seawater is provided. The method includes receiving treated seawater at an inlet port of a first manifold connected to input ports of a reverse osmosis unit. The treated seawater is at a first pressure. The method further includes separating, by the reverse osmosis unit, the treated seawater into a first quantity of purified water and a second quantity of wastewater having a first concentration of dissolved salts. The method further includes expelling the second quantity of wastewater at a second pressure from an outlet port of a second manifold connected to output ports of the reverse osmosis unit. The method further includes receiving the second quantity of wastewater at a pressure exchanger. The second pressure is lower than the first pressure. The method further includes reducing the second pressure to atmospheric pressure in the pressure exchanger and inputting the second quantity of wastewater to a laser induced shock wave crystallizer. The method further includes crystallizing the first concentration of dissolved salts in the laser induced shock wave crystallizer and generating a third quantity of wastewater having a second concentration of dissolved salts and a fourth quantity of salt crystals. Herein, the second concentration is less than the first concentration. The method further includes collecting the salt crystals in a collection vat. The method further includes recycling the third quantity of wastewater to the reverse osmosis unit.

In some embodiments, the method further includes receiving untreated seawater through a reservoir intake port. The method also includes removing, by a sieve, large particles from the untreated seawater, where the large particles have a diameter greater than 0.0001 microns. The method also includes injecting chemicals including water softeners, acid, and anti-scalants into the untreated seawater in the reservoir to generate the treated seawater. The method also includes controlling, by a recirculating chiller, the temperature of the treated seawater to 23±1° C.

In some embodiments, the method further includes pumping, by a high pressure pump, the treated seawater from the reservoir to the first manifold.

In some embodiments, the method further includes reducing the second pressure to atmospheric pressure in the pressure exchanger by: injecting the treated seawater into a first duct of the pressure exchanger; injecting the second quantity of wastewater into a second duct of the pressure exchanger, where the second duct is parallel to the first duct; and rotating the first duct and the second duct to transfer energy from the second duct to the first duct.

In some embodiments, the method further includes receiving the treated wastewater at a booster pump inlet connected to the pressure exchanger. The method also includes pumping the treated wastewater out of a booster pump outlet to the reverse osmosis unit.

In some embodiments, the method further includes emitting, by a laser, pulses of coherent light. The method also includes collimating, by a reflective concentric mirror located on an outer surface of the laser induced shock wave crystallizer, the reflective concentric mirror having a central aperture, the pulses of coherent light. The method also includes generating acoustic shock waves in the second quantity of concentrated wastewater by internal reflection of the pulses of coherent light between the outer surface of the laser induced shock wave crystallizer and the reflective concentric mirror. The method also includes triggering nucleation of salt crystals by the acoustic shock waves.

In yet another exemplary embodiment, a method of assembling a hybrid desalination and crystallization system is provided. The method includes connecting, by a first pipe, a high pressure pump to a reservoir pipe connected to a reservoir of treated seawater. The method further includes connecting, by a second pipe, an inlet port of a first manifold to the high pressure pump. The method further includes connecting the first manifold to each input port of a plurality of membrane vessels of a reverse osmosis unit. The method further includes connecting a second manifold to each output port of the plurality of membrane vessels. The method further includes connecting, by a third pipe, a booster pump to the second pipe. The method further includes connecting the booster pump to a first duct output port of a pressure exchanger. The method further includes connecting, by a fourth pipe, an outlet port of the second manifold to a second duct input port of the pressure exchanger. The method further includes connecting a first duct input port of the pressure exchanger to the first pipe. The method further includes connecting, by a fifth pipe, a second duct output port of the pressure exchanger to a laser induced shock wave crystallizer input port. The booster pump is connected to the first duct output port of the pressure exchanger by a sixth pipe. The method further includes connecting, by a seventh pipe, a laser induced shock wave crystallizer output port to the reservoir pipe. The method further includes inserting a check valve between the reservoir pipe and the laser induced shock wave crystallizer output port.

In some embodiments, the method further includes attaching a reflective concentric mirror to an outer surface of the laser induced shock wave crystallizer, the reflective concentric mirror having a central aperture. The method also includes aligning a laser gun with the central aperture.

In some embodiments, the method further includes attaching a reservoir intake port including a sieve to a source of untreated seawater. The method also includes filling the reservoir with the untreated seawater.

In some embodiments, the method further includes treating the untreated seawater by injecting chemicals including water softeners, acid, and anti-scalants through a chemical input port to the reservoir.

In some embodiments, the method further includes immersing a recirculating chiller in the treated seawater. The method also includes setting the recirculating chiller to a temperature of 23±1° C.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
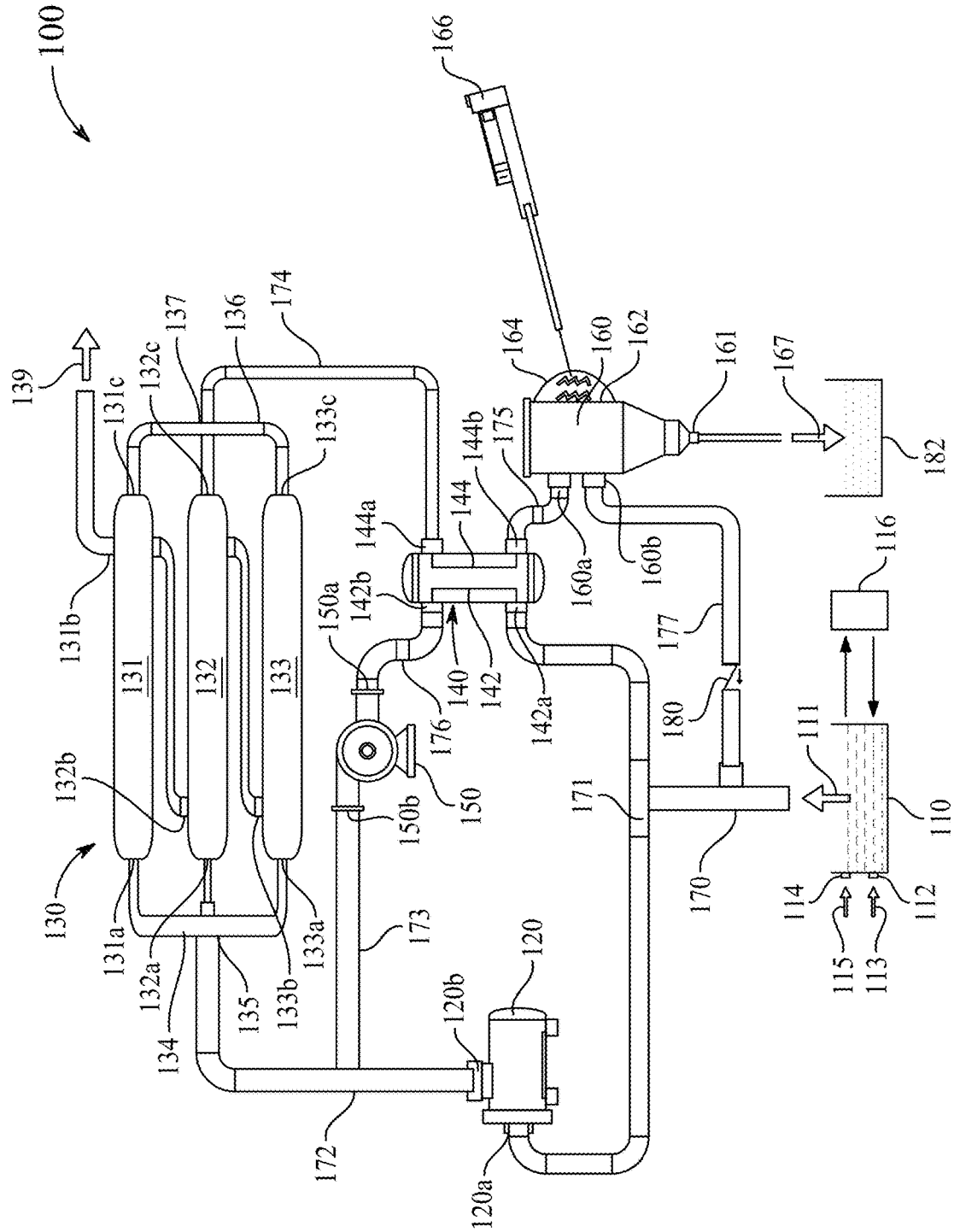
FIG. 1 is a schematic diagram of a hybrid desalination and crystallization system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and methods for hybrid desalination and crystallization of wastewater. The present disclosure relates to a hybrid desalination and crystallization system in which a reverse osmosis unit firsts treat the wastewater (for example, from a petrochemical plant with high Total Dissolved Solids (TDS)), and the concentrated reject brine from the reverse osmosis unit then passes through a laser induced shock wave crystallizer to crystallize the salts. This process continues until all salts are crystallized or until the TDS drops to an acceptable limit at which the wastewater may not require further treatment or dilution. Thus, the system and the method of the present disclosure may save the pure water used for dilution in the petrochemical plant or separate pure water from seawater, thereby reducing the operational cost and improving operational efficiency thereof.

Referring to FIG. 1, illustrated is a schematic diagram of a hybrid desalination and crystallization system 100 (hereinafter referred to as "the system 100"), according to certain embodiments. The embodiments of the present disclosure are described in terms of implementing the system 100 for purifying seawater; however, it may be understood that the implementation is exemplary in nature and the present system 100 may be utilized for processing (purifying) any type of wastewater with dissolved salts, including wastewater for industrial plants (like petrochemical plants) without departing from the spirit and the scope of the present disclosure. Hereinafter, the term "seawater" shall be construed to include "wastewater," and these two terms are interchangeably used without limiting aspects of the present disclosure.

In FIG. 1, the system 100 has been shown to include multiple components connected to each other by various pipes. The pipes may be of the same diameter or may have different diameters. Further, some of the pipes have been shown to be bent at various points, such as, by employing bends, elbows and the like known in the art. It may be appreciated that the illustrated piping layout in FIG. 1 is exemplary and should not be construed as limiting.

The system 100 includes a reservoir 110, a high pressure pump 120, a reverse osmosis unit 130, a pressure exchanger 140, a booster pump 150, and a laser induced shock wave crystallizer 160. Further, as illustrated in FIG. 1, in the system 100, a reservoir pipe 170 is connected to the reservoir 110; a first pipe 171 connects the reservoir pipe 170 to the high pressure pump 120; a second pipe 172 connects the high pressure pump 120 to the reverse osmosis unit 130; a third pipe 173 connects the second pipe 172 to the booster pump 150; a fourth pipe 174 connects the reverse osmosis unit 130 to the pressure exchanger 140; a fifth pipe 175 connects the pressure exchanger 140 to the laser induced shock wave crystallizer 160; a sixth pipe 176 connects the pressure exchanger 140 to the booster pump 150; and a seventh pipe 177 connects the laser induced shock wave crystallizer 160 to the reservoir pipe 170.

In the system 100, the reservoir 110 is a supply source of treated water (as represented by an arrow and denoted by reference numeral '111'). The reservoir 110 may be in the form of a container of sufficient volume to store a required quantity of the treated water 111 therein. In order to be filled with the treated water 111, the reservoir 110 is provided with a reservoir intake port 112 which is configured to receive untreated seawater (as represented by an arrow and denoted by reference numeral '113') from a source of untreated seawater (like sea). In an example, the reservoir intake port 112 includes a sieve (not shown) configured to remove large particles from the untreated seawater 113. The large particles in the untreated seawater 113 may have a diameter greater than 0.0001 microns. Further, in some examples, the reservoir 110 is provided with a chemical input port 114 which is configured to inject chemicals (as represented by an arrow and denoted by reference numeral '115') into the untreated seawater 113 (as received via the reservoir intake port 112 into the reservoir 110), to process the untreated seawater 113 and thereby generate the treated seawater 111 for storage in the reservoir 110. The chemicals 115 may include water softeners, acid, and anti-scalants; or any other suitable chemical(s), as known in the art for treatment of seawater. In an aspect, the chemicals 115 may be injected into the reservoir 110 via the chemical input port 114 either manually, or automatically (as discussed later).

In some embodiments, the reservoir 110 is also provided with a recirculating chiller 116 associated with the reservoir 110. In an aspect, the recirculating chiller 116 is configured to control temperature of the treated seawater 111 to 23±1° C. That is, the recirculating chiller 116 is configured to control the temperature of the treated seawater 111 to be close to 23° C. with a possible deviation of 1° C.; in other words, within a temperature range of 22° C.-24° C. It may be appreciated that the given temperature value (or temperature range) may be so defined to be suitable for the described embodiments of the present system 100; however, in other examples, the temperature value (or temperature range) may be altered depending on operations, ambient conditions, etc.

In an example, the recirculating chiller 116 may be an immersion-type chiller. Such recirculating chiller 116 may be immersed in the reservoir 110 to control (regulate) the temperature of the treated seawater 111.

Further, the high pressure pump 120 has an inlet 120a and an outlet 120b. The reservoir pipe 170 is configured to connect the reservoir 110 with the first pipe 171 leading to the inlet 120a of the high pressure pump 120. Thereby, the high pressure pump 120 receives the treated seawater 111, from the reservoir 110. The high pressure pump 120 is configured to increase a pressure of the received treated seawater 111. In the system 100, the pressure of the treated seawater 111 is required to be increased, as the treated seawater 111 is passed to and processed (filtered) at the reverse osmosis unit 130 which requires the pressure of the treated seawater 111 to be high for its operation. In an example, the pressure of the treated seawater 111 is elevated to about 60 bar (or, for example, in a range of about 50 to about 70 bar). Such pressurized treated seawater 111 exits the high pressure pump 120 via the outlet 120b thereof, to be supplied to the reverse osmosis unit 130 via the second pipe 172.

In an aspect, the system 100 includes at least three membrane vessels located in the reverse osmosis unit 130. As illustrated, the reverse osmosis unit 130 includes a first membrane vessel 131, a second membrane vessel 132, and a third membrane vessel 133. In an example, the three membrane vessels 131, 132 and 133 may include spiral wound membranes assembled inside corresponding pressure vessels. In an aspect, the three membrane vessels 131, 132 and 133 may be disposed parallel to each other. This way the three membrane vessels 131, 132 and 133 of the reverse osmosis unit 130 may work in tandem (simultaneously) to filter the pressurized treated seawater 111. However, in other examples, the three membrane vessels 131, 132 and 133 may be disposed in series albeit with few variations to the piping network illustrated in FIG. 1. Each membrane vessel 131, 132, 133 has an input port, a first output port and a second output port. For example, the first membrane vessel 131 has an input port 131a, a first output port 131b and a second output port 131c; the second membrane vessel 132 has an input port 132a, a first output port 132b and a second output port 132c; and the third membrane vessel 133 has an input port 133a, a first output port 133b and a second output port 133c.

The system 100 also includes a first manifold 134 having an inlet port 135, and a second manifold 136 having an outlet port 137. As illustrated, the first manifold 134 is connected at the inlet port 135 to the second pipe 172 leading to the outlet 120b of the high pressure pump 120. Further, the first manifold 134 is connected to the input port 131a, 132a, 133a of corresponding membrane vessels 131, 132, 133. Therefore, the first manifold 134 receives the pressurized treated water 111, via the second pipe 172, at the inlet port 135 thereof, to be supplied to the membrane vessels 131, 132 and 133 through corresponding input ports 131a, 132a, 133a. The membrane vessels 131, 132 and 133 are configured to separate the seawater from dissolved solids, generate a first quantity of purified water, and generate a second quantity of wastewater having a first concentration of dissolved salts. In an example, the reverse osmosis unit 130 may separate the high pressure treated seawater into the purified water (about 40%) and the second quantity of wastewater (about 60%).

In general, the reverse osmosis process removes contaminants from unfiltered water, or feed water, when pressure forces it through semipermeable membrane, such as membranes disposed in each of the membrane vessels 131, 132 and 133. Water flows from high concentrated side (more contaminants) of the membrane vessels 131, 132 and 133 to a less concentrated side (fewer contaminants) to provide clean drinking water. Fresh water produced from such membrane filtration is referred to as permeate, and concentrated water left over is referred to as waste or brine. The membrane vessels 131, 132 and 133 have small pores that block contaminants but allow water molecules to flow through. In the reverse osmosis process, the concentration of water increases as the water passes through the membrane vessels 131, 132 and 133 in order to obtain equilibrium on both sides of the membrane. The reverse osmosis process, however, blocks contaminants from entering the less concentrated side of the membrane vessels 131, 132 and 133. For example, when pressure is applied to a volume of saltwater during reverse osmosis, briny salt water is left behind and only clean water passes through the semipermeable membrane. Feed water pretreatment, as discussed in the preceding paragraphs, is important in the operation of the reverse osmosis unit 130 due to sensitivity of the membrane vessels 131, 132 and 133 to fouling. Pretreatment commonly includes feed water sterilization, filtration, and addition of chemicals in order to prevent scaling and biofouling of the membrane vessels 131, 132 and 133.

Subsequent to filtration in the reverse osmosis unit 130, the first output port 131b, 132b, 133b of respective membrane vessel 131, 132, 133 is configured to eject the purified water (as represented by an arrow and denoted by reference numeral '139') generated therein, to expel the first quantity of purified water 139. The purified water 139 exits from the reverse osmosis unit 130 at atmospheric pressure while the second quantity of wastewater exits from the reverse osmosis unit 130 at high pressure (close to 57 bar). Although not shown, in some examples, the first output ports 131b, 132b and 133b of respective membrane vessels 131, 132 and 133 may be connected to a manifold or the like, to expel the first quantity of purified water 139 therefrom. Also, as illustrated, the second manifold 136 is connected at the outlet port 137 to the fourth pipe 174 that is connected to the pressure exchanger 140. The second manifold 136 is further connected to the second output ports 131c, 132c, 133c of respective membrane vessel 131, 132, 133. Therefore, the second manifold 136 receives the second quantity of wastewater having the first concentration of dissolved salts, which is generally at a high pressure (about 57 bar, because of high pressure intake of the treated wastewater and the reverse osmosis process not causing any significant pressure drop), to be passed to the pressure exchanger 140, via the fourth pipe 174.

The pressure exchanger 140 includes a first duct 142 and a second duct 144. The first duct 142 has a first duct input port 142a (also referred to as a first pressure exchanger input port and denoted by the same reference numeral '142a') and a first duct output port 142b (also referred to as a first pressure exchanger output port and denoted by the same reference numeral '142b'). Similarly, the second duct 144 has a second duct input port 144a (also referred to as a second pressure exchanger input port and denoted by the same reference numeral '144a') and a second duct output port 144b (also referred to as a second pressure exchanger output port and denoted by the same reference numeral '144b'). In other words, the first duct 142 is connected between the first pressure exchanger input port 142a and the first pressure exchanger output port 142b; and the second duct 144 is connected between the second pressure exchanger input port 144a and the second pressure exchanger output port 144b. In an aspect, the first duct 142 is arranged parallel to the second duct 144. In general, the pressure exchanger 140 is used to transfer pressure energy from a high pressure fluid stream to a low pressure fluid stream. In the system 100, the pressure exchanger 140 is configured to lower a pressure of the second quantity of wastewater to atmospheric pressure, to be further used in the laser induced shock wave crystallizer 160 (as discussed later). The pressure exchanger 140 is further configured to recover the lost pressure from the second quantity of wastewater, to increase pressure of the treated seawater 111, to be used in the reverse osmosis unit 130 (again discussed later). In an example, the pressure exchanger 140 is a rotary-type pressure exchanger as known in the art.

For this purpose, as illustrated, the first pressure exchanger input port 142a is connected to the first pipe 171, to receive the treated wastewater. The second pressure exchanger input port 144a is connected to the fourth pipe 174, which is connected to the second manifold 136, to receive the second quantity of wastewater. The system 100 has the treated wastewater at a first pressure in the first pipe 171 and the second quantity of wastewater at a second pressure in the fourth pipe 174. As such, the pressure exchanger 140 is configured to receive the treated seawater at the first pressure at the first pressure exchanger input port 142a from the first pipe 171, and the second quantity of wastewater at the second pressure at the second pressure exchanger input port 144a from the fourth pipe 174. As may be understood from above discussion, the second pressure is greater than the first pressure. In an aspect, the pressure exchanger 140 is rotated to cause rotation of the first duct 142 and the second duct 144 therein, to transfer energy from the second duct 144 to the first duct 142 without mixing respective fluids, and thereby lowering the pressure of the second quantity of wastewater to atmospheric pressure and increasing pressure of the treated seawater 111 to a third pressure (which may be in a range of 20-50 bar). The pressure exchanger 140 is then configured to expel the treated seawater at the third pressure from the first pressure exchanger output port 142b and expel the second quantity of wastewater at the atmospheric pressure at the second pressure exchanger output port 144b.

In the present system 100, the treated seawater, from the pressure exchanger 140, is to be used in the reverse osmosis unit 130. As discussed, in order for the treated seawater to be filtered by the reverse osmosis unit 130, the treated seawater needs to be at a high pressure (close to 60 bar). The pressure exchanger 140 may help to increase the pressure of the treated seawater to the third pressure (i.e., about 20-50 bar), but that may not be sufficient (up to the required high pressure) for processing in the reverse osmosis unit 130. Therefore, the system 100 implements the booster pump 150. As discussed, the pressure exchanger 140 is connected to the booster pump 150 by the sixth pipe 176. In particular, the booster pump 150 has the booster pump inlet 150a and the booster pump outlet 150b. The sixth pipe 176 is connected between the booster pump inlet 150a and the first pressure exchanger output port 142b. Further, the third pipe 173 is configured to connect the booster pump outlet 150b to the second pipe 172. As such, the booster pump 150 receives the treated seawater at the third pressure at the booster pump inlet 150a, from the first pressure exchanger output port 142b of the pressure exchanger 140. The booster pump 150 is configured to increase the pressure of the treated seawater to the required pressure such that the treated seawater may be filtered by the reverse osmosis unit 130. The booster pump 150 then expels the treated seawater with elevated pressure at the booster pump outlet 150b, into the third pipe 173, to be transferred to the second pipe 172, which in turn passes it to the reverse osmosis unit 130. Additionally, the booster pump 150 serves to draw or suction the treated wastewater through the pressure exchanger 144 and through the first pressure exchanger output port 142b.

Further, the pressure exchanger 140 is connected to the laser induced shock wave crystallizer 160 by the fifth pipe 175. Also, the laser induced shock wave crystallizer 160 is connected to the reservoir pipe 170 by the seventh pipe 177. In particular, the laser induced shock wave crystallizer 160 has an input port 160a and an output port 160b. The laser induced shock wave crystallizer 160 also has an outtake port 161. The fifth pipe 175 is connected between the second pressure exchanger output port 144b and the input port 160a of the laser induced shock wave crystallizer 160, and the seventh pipe 177 is connected between the output port 160b of the laser induced shock wave crystallizer 160 and the reservoir pipe 170. As such, the expelled second quantity of (concentrated) wastewater at the atmospheric pressure from the pressure exchanger 140 (at the second pressure exchanger output port 144b) is received in the laser induced shock wave crystallizer 160 via the fifth pipe 175.

The laser induced shock wave crystallizer 160 has an outer surface 162. Also, a reflective concentric mirror 164 is located on the outer surface 162 of the laser induced shock wave crystallizer 160. The concentric mirror is concave so as to reflect laser beams between the reflective surface of the mirror and a polished wall of the shock wave crystallizer 160. The system 100 also includes a laser 166 (also sometimes referred to as "laser gun" and denoted by the same reference numeral '166') associated with the laser induced shock wave crystallizer 160. The laser 166 is configured to emit pulses of coherent light. Reliable and stable pulsed Nd:YAG (neodymium-doped yttrium aluminum garnet; $Nd:Y_3Al_5O_{12}$) lasers for industrial and scientific applications provide outputs of up to 1.5 J at 1064 nm and repetition rates up to 100 Hz. They can be equipped with build-in or external 2nd (532 nm), 3rd (355 nm), 4th (266 nm) and 5th (213 nm) harmonic generators. Pulsed Nd:YAG lasers are typically operated in a Q-switching mode. An optical switch is inserted in the laser cavity waiting for a maximum population inversion in the neodymium ions before it opens. Then the light wave can run through a laser cavity, depopulating the excited laser medium at maximum population inversion. In this Q-switched mode, output powers of 250 megawatts and pulse durations of 5 to 25 nanoseconds have been achieved. In a non-limiting example, the laser 166 may be a standard Nd: YAG (available from, for example, ALPHALAS GmbH, Germany) configured to generate laser pulses of second harmonic output at 532 nm with a 3-9 nanosecond pulse duration. The reflective concentric mirror 164 has a central aperture (not shown in FIG. 1). The central aperture of the reflective concentric mirror 164 is aligned with direction of the emitted pulses of coherent light from the laser 166. The central aperture is configured to collimate coherent light entering the central aperture, which then impinges on the outer surface 162 of the laser induced shock wave crystallizer 160. The laser pulses may hit the outer surface 162 of the laser induced shock wave crystallizer 160 with small incident angle to eliminate zero angle back reflection and simultaneously increase the cross section of internal reflections between the outer surface 162 and an internal surface (not labelled) of the reflective concentric mirror 164. The pulses of coherent light generate acoustic shock waves in the second quantity of concentrated wastewater present in the laser induced shock wave crystallizer 160. The size of the central aperture should be circular and of size at least two to three times greater than the width of the laser beam at the entry of the aperture, so as to eliminate any diffraction effects. The mirror coating should be highly reflective, sustain high intensity laser beam hits as well as being a high temperature coating. An acoustic shock wave is a strong pressure wave in an elastic medium, such as water, that creates violent changes in pressure. Shock waves differ from sound waves in that the wave front, in which compression takes place, is a region of sudden and violent changes in stress, density, and temperature. A shock wave is defined by an abrupt, nearly discontinuous change in pressure and by having a velocity that is higher than the speed of sound in the medium it propagates. Generally a shock wave can be described as a single pulse with a wide frequency range (from 150 kHz to 100 MHz), high pressure amplitude (up to 150 MPa), low tensile wave (up to −25 MPa), small pulse width and a short rise time of up to a few hundred nanoseconds. The acoustic shock waves trigger nucleation of salt in the concentrated wastewater present in the laser induced shock wave crystallizer 160. That is, each time the laser beam hits the outer surface 162 of the laser induced shock wave crystallizer 160, a laser induced acoustic shock wave may be generated which may, in turn, induce crystal growth within the concentrated wastewater present in the laser induced shock wave crystallizer 160. The proposed layout for the laser induced shock wave crystallizer 160 and the associated components, including the reflective concentric mirror 164 and the laser 166, is designed to provide optimal use of laser pulses in addition to protecting optics of the laser 166 from reflected pulses.

It may be understood that crystallization starts with nucleation, which is simply defined as the ordered growth of atoms to form extendable tightly bonded structures. A perturbation mechanism that can trigger growth of a simple cluster is essential to increase nucleation in saline solutions. Nucleation can be explained by a thermodynamic imbalance between the solution and the solid phases which is driven by the difference in the chemical potential between the two phases [See: Sohnel O, Garside J. "Precipitation: basic principles and industrial applications". Oxford: Butterworth-Heinemann; 1992, incorporated herein by reference in its entirety] and involves nucleation and large crystal growth.

The induced nucleation to form large crystals can be triggered due to many perturbations, i.e., mechanical [See: Cardew P, Davey R. "Symposium on the tailoring of crystal growth". London: Institution of Chemical Engineers; 1982], sonic [See: Pokroy, B.; Aichmayer, B.; Schenk, A. S.; Haimov, B.; Kang, S. H.; Fratzl, P.; Aizenberg, J. "Sonication-assisted synthesis of large, high quality mercury thiolate single crystals directly from liquid mercury". J.Am. Chem. Soc. 2010, 132, 143.55-14357], thermal [See: Khamskii, E. V. "Crystallization from solutions"; Consultants Bureau: New York; 1969], nuclear radiation [See: Mahurin S, McGinnis M, Board J S, Hulett L D, Pagni R M, Compton R N. "Effect of beta radiation on the crystallization of sodium chlorate from water: a new type of asymmetric synthesis". Chirality 2001; 13:636], and photochemical and non-photochemical interventions.

The mechanical intervention processes such as mechanical shocks, agitations, and pressure gradients may be achieved by producing shock waves from nanosecond laser pulses [See: Garetz, B. A.; Aber, J. E.; Goddard, N. L.; Young, R. G.; Myerson, A. S. "Nonphotochemical, polarization-dependent, laser-induced nucleation in supersaturated aqueous urea solutions". Phys. Rev. Lett. 1996, 77, 3475-3476, and Zaccaro J, Matic J, Myerson A, Garetz B. "Non-photochemical, laser-induced nucleation of supersaturated aqueous glycine produces unexpected g-polymorph". Cryst Growth Des 2001; 1:5, incorporated herein by reference in its entirety]. It is well-established that when nanosecond duration laser pulses hit the surface of a solid material the laser energy absorption of the target surface generates a plasma whose expansion within the solid bulk induces by reaction a shock wave of pressure gradient. When reaching a solid-liquid interface, the shock wave can propagate within the solution which resulted in formation of compression pressure waves within the solution. These waves can trigger nucleation, consequently, induce large crystal growth within the solution [See: Zaccaro J, Matic J, Myerson A, Garetz B. "Non-photochemical, laser-induced nucleation of supersaturated aqueous glycine produces unexpected g-polymorph". Cryst Growth Des 2001; 1:5, incorporated herein by reference in its entirety]. In particular, shock waves propagation in saline solutions induce nucleation by jet flow formations and cavitation bubbles. These mechanisms work hand in hand to induce nucleation into large crystalline structures.

Fundamentally, laser induced-nucleation is generated by the difference in the chemical potential ($\Delta\mu$) of the solute between its solid and solution phases where the rate of nucleation can be given as [See: Oxtoby, D. W. Nature 2002, 420, 277, incorporated herein by reference in its entirety];

$$J = Ae^{-\left(\frac{16\pi}{3}\right)\left(\frac{\gamma^3 V_m^2}{\Delta\mu^2 k_B T}\right)} \quad (1)$$

wherein, A is a normalization factor, $\gamma$ is the interfacial tension of the solid phase and the solution phase, and $V_m$ is the molar volume of the solute solid. For supersaturated solutions, the difference in the chemical potential can be given as [See: Mirsaleh-Kohan, N.; Fischer, A.; B. Graves, M. Bolorizadeh, D. Kondepudi and R. N. Compton, Cryst. Growth Des. 17 (2017) 576-581, incorporated herein by reference in its entirety];

$$\Delta\mu = RT\ln\left(\frac{c}{c_0}\right) \quad (2)$$

wherein, the c and $c_0$ are the solute concentration in solution and the solute concentration at supersaturation; respectively.

The laser induced shock wave crystallizer 160 is configured to trigger nucleation of the dissolved salts in the second quantity of wastewater, to generate a third quantity of wastewater having a second concentration of dissolved salts and a fourth quantity of salt crystals (as represented by an arrow and denoted by reference numeral '167'). In the present embodiments, the second concentration of dissolved salts in the expelled third quantity of wastewater is less than the first concentration of dissolved salts in the second quantity of wastewater, as received in the laser induced shock wave crystallizer 160. The laser induced shock wave crystallizer 160 is configured to expel the third quantity of wastewater having the second concentration of dissolved salts at the laser induced shock wave crystallizer output port 160b and expel the fourth quantity of salt crystals 167 at the outtake port 161.

The third quantity of wastewater having the second concentration of dissolved salts is expelled from the laser induced shock wave crystallizer 160 at the laser induced shock wave crystallizer output port 160b. The expelled third quantity of wastewater is transferred via the seventh pipe 177 to the reservoir pipe 170. In an embodiment, a check valve 180 is connected between the seventh pipe 177 and the reservoir pipe 170. The check valve 180 is employed to provide a one-way flow. In particular, the check valve 180 is configured to prevent the treated seawater 111 in the reservoir pipe 170 from flowing into the seventh pipe 177, and therefrom to the laser induced shock wave crystallizer 160. Further, the high pressure pump 120 is configured to recycle the third quantity of wastewater back to the reverse osmosis unit 130, via the first pipe 171 and the second pipe 172. The recycled third quantity of wastewater may further be filtered in the reverse osmosis unit 130, and the generated concentrated brine therefrom may further be passed to the laser induced shock wave crystallizer 160 so that the dissolved salts may be crystallized. This resultant third quantity of wastewater may contain few contaminants, as it is repetitively processed through the reverse osmosis membranes and crystalline components are extracted.

Also, as illustrated, the system 100 may include a collection vat 182. The collection vat 182 may be adapted for receiving the salt crystals 167, or specifically the fourth quantity of salt crystals 167, from the outtake port 161 of the laser induced shock wave crystallizer 160. For this purpose, the collection vat 182 may be placed directly below the outtake port 161 of the laser induced shock wave crystallizer 160 to receive (by gravity) and collect the salt crystals 167 therein. Thus, the salt crystals 167 may be harvested from the blowdown stream at the bottom of the laser induced shock wave crystallizer 160 while the rest of the concentrated stream will continue to flow out of the laser induced shock wave crystallizer 160 and return back to the reverse osmosis unit 130 with the fresh feed.

Figure 2:
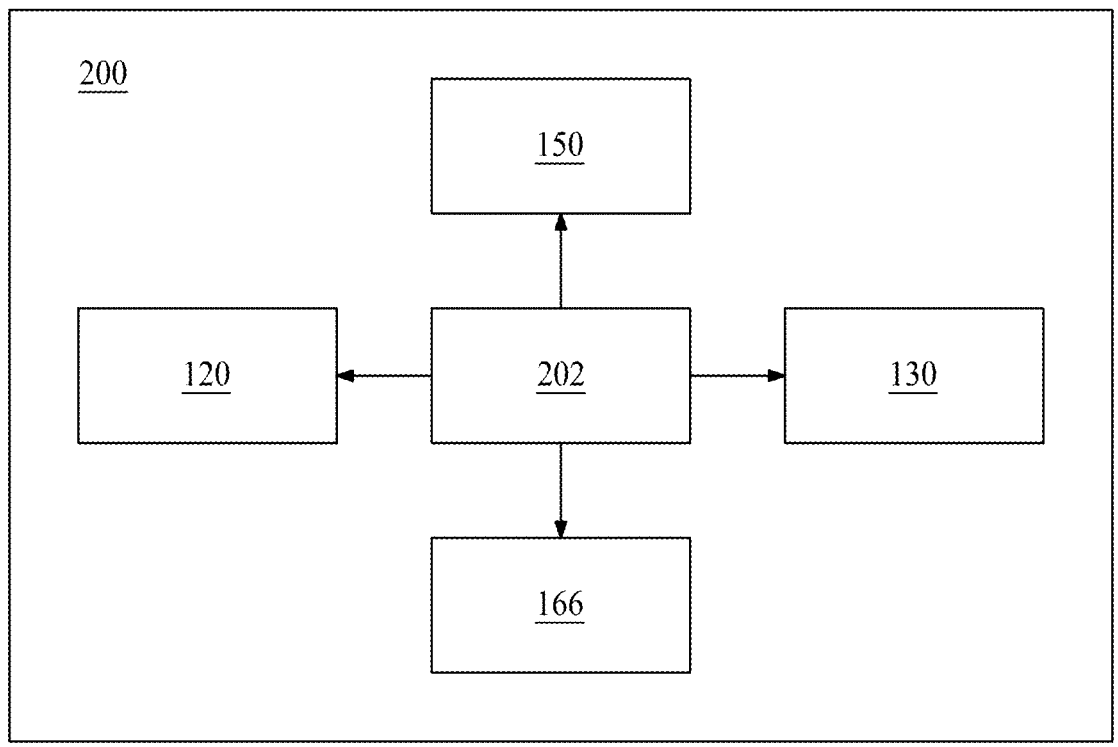
FIG. 2 is a block diagram of a computing system for controlling operations of the hybrid desalination and crystallization system, according to certain embodiments.

Referring to FIG. 2, illustrated is a block diagram of a computing system 200 for controlling operations of the system 100. The computing system 200 includes a controller 202. The controller 202 is disposed in signal communication with various elements to be controlled in the system 100. In an exemplary embodiment, as illustrated in FIG. 2, the controller 202 may be employed to control operations of the high pressure pump 120, the reverse osmosis unit 130, the booster pump 150 and the laser 166. In case of the high pressure pump 120, the controller 202 may control switching ON and OFF, and regulation of pressure of the treated seawater 111 by the high pressure pump 120. In case of the reverse osmosis unit 130, the controller 202 may control its operation including regulating operating temperature (by use of temperature regulators (not shown)) and/or inducing vibrations to de-clog the membrane vessels 131, 132 and 133, and the like. In case of the booster pump 150, similar to the high pressure pump 120, the controller 202 may control switching ON and OFF, and regulation of pressure of the treated seawater 111 by the booster pump 150. In case of the laser 166, the controller 202 may control switching ON and OFF of the laser 166 to cause controlled generation of shock waves and thereby regulate nucleation and generation of salt crystals 167. In some embodiments, the controller 202 may further be configured to control operations of the reservoir intake port 112, the chemical input port 114, etc. to automate control of inflow and generation of the treated seawater 111, and the like.

In the present examples, the controller 202 may be implemented in hardware, firmware or software, or some combination of at least two of the same. It should be noted that the functionality associated with the controller 202 may be centralized or distributed, whether locally or remotely. The controller 202 may be a multi-core processor, a single core processor, or a combination of one or more multi-core processors and one or more single core processors. For example, the one or more processors may be embodied as one or more of various processing devices, such as a coprocessor, a microprocessor, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

Figure 3:
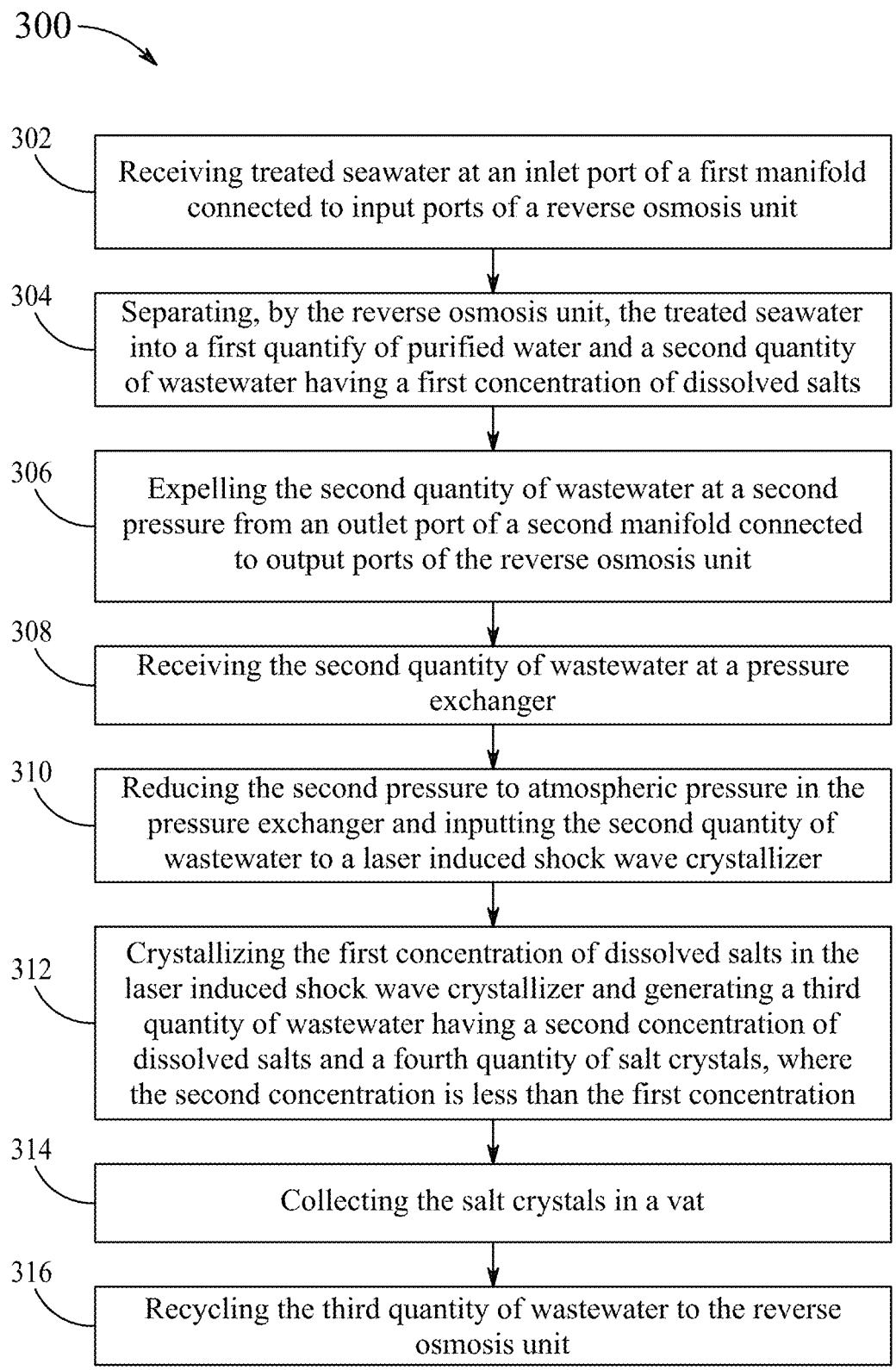
FIG. 3 is a flowchart of a method for hybrid desalination and crystallization of seawater, according to certain embodiments.

Referring to FIG. 3, illustrated is a flowchart of a method 300 for hybrid desalination and crystallization of seawater, according to certain embodiments. The method 300 has been described in conjunction with FIG. 1.

At step 302, the method 300 includes receiving the treated seawater 111 at the inlet port 135 of the first manifold 134 connected to input ports 131a, 132a, 133a of the reverse osmosis unit 130. Herein, first, the method 300 includes receiving the untreated seawater 113 through the reservoir intake port 112. The method 300 also includes removing, by the sieve (not shown), large particles from the untreated seawater 113, where the large particles have a diameter greater than 0.0001 microns. The method 300 further includes injecting chemicals 115 including water softeners, acid, and anti-scalants into the untreated seawater 113 in the reservoir 110 to generate the treated seawater 111. In some examples, the method 300 also includes controlling, by the recirculating chiller 116, the temperature of the treated seawater 111 to 23±1° C. Thereafter, the method 300 includes pumping, by the high pressure pump 120, the treated seawater 111 from the reservoir 110 to the first manifold 134.

At step 304, the method 300 includes separating, by the reverse osmosis unit 130, the treated seawater 111 into the first quantity of purified water 139 and the second quantity of wastewater having a first concentration of dissolved salts. The treated seawater 111 received at the first manifold 134 is passed into the membrane vessels 131, 132 and 133 which are configured to separate the seawater from dissolved solids, generate the first quantity of purified water 139, and generate the second quantity of wastewater having the first concentration of dissolved salts. In an example, the reverse osmosis unit 130 may separate the high pressure treated seawater into the purified water 139 (about 40%) and the second quantity of wastewater (about 60%).

At step 306, the method 300 includes expelling the second quantity of wastewater at the second pressure from the outlet port 137 of the second manifold 136 connected to the output ports (i.e., the second output ports 131c, 132c and 133c) of the reverse osmosis unit 130. The second manifold 136 is connected to the second output port 131c, 132c, 133c of each membrane vessel 131, 132, 133. Thereby, the second manifold 136 receives the second quantity of wastewater having the first concentration of dissolved salts, which is generally at a high pressure (about 57 bar) and expels the second quantity of wastewater from the outlet port 137 thereof. Further, the first output port 131b, 132b, 133b of each membrane vessel 131, 132, 133 is configured to expel the first quantity of purified water 139 therefrom at the atmospheric pressure.

At step 308, the method 300 includes receiving the second quantity of wastewater at the pressure exchanger 140. As discussed, the second manifold 136 expels the second quantity of wastewater from the outlet port 137 thereof. The second manifold 136 is connected at the outlet port 137 to the fourth pipe 174, which is connected to the pressure exchanger 140. Thereby, the second quantity of wastewater, at the second pressure, is received at the pressure exchanger 140 via the fourth pipe 174.

At step 310, the method 300 includes reducing the second pressure to the atmospheric pressure in the pressure exchanger 140 and inputting the second quantity of wastewater to the laser induced shock wave crystallizer 160. Herein, the method 300 includes reducing the second pressure to the atmospheric pressure in the pressure exchanger 140 by injecting the treated seawater at the first pressure into the first duct 142 of the pressure exchanger 140, also injecting the second quantity of wastewater at the second pressure into the second duct 144 of the pressure exchanger 140, where the second duct 144 is parallel to the first duct 142, and then rotating the first duct 142 and the second duct 144 to transfer energy from the second duct 144 to the first duct 142.

At step 312, the method 300 includes crystallizing the first concentration of dissolved salts in the laser induced shock wave crystallizer 160 and generating the third quantity of wastewater having the second concentration of dissolved salts and the fourth quantity of salt crystals 167, where the second concentration is less than the first concentration. For this purpose, the method 300 includes emitting, by the laser 166, pulses of coherent light. The method 300 also includes collimating, by the reflective concentric mirror 164, the pulses of coherent light. The reflective concentric mirror 164, located on the outer surface 162 of the laser induced shock wave crystallizer 160, helps to collimate the pulses of coherent light using the central aperture therein. The method 300 further includes generating acoustic shock waves in the second quantity of concentrated wastewater by internal reflection of the pulses of coherent light between the outer surface 162 of the laser induced shock wave crystallizer 160 and the reflective concentric mirror 164. Further, the method 300 includes triggering nucleation of salt crystals by the acoustic shock waves, which results in generation of the fourth quantity of salt crystals 167 in the laser induced shock wave crystallizer 160.

At step 314, the method 300 includes collecting the salt crystals 167 in the collection vat 182. The collection vat 182 is adapted for receiving the salt crystals 167, or specifically the fourth quantity of salt crystals 167, from the outtake port 161 of the laser induced shock wave crystallizer 160. The collection vat 182 may be placed directly below the outtake port 161 of the laser induced shock wave crystallizer 160 to receive and collect the salt crystals 167 therein. Thus, the salt crystals 167 may be harvested from the blowdown stream at the bottom of the laser induced shock wave crystallizer 160.

At step 316, the method 300 includes recycling the third quantity of wastewater to the reverse osmosis unit 130. The third quantity of wastewater having the second concentration of dissolved salts is expelled from the laser induced shock wave crystallizer 160 at the laser induced shock wave crystallizer output port 160*b*. The expelled third quantity of wastewater is passed via the seventh pipe 177 to the reservoir pipe 170. The check valve 180 is configured to prevent the treated seawater 111 in the reservoir pipe 170 from flowing into the seventh pipe 177, and therefrom to the laser induced shock wave crystallizer 160. Further, the high pressure pump 120 is configured to recycle the third quantity of wastewater back to the reverse osmosis unit 130, via the first pipe 171 and the second pipe 172.

Although not specifically illustrated through blocks, in some aspects, the method 300 also includes receiving the treated wastewater at the booster pump inlet 150*a* connected to the pressure exchanger 140. The booster pump 150 receives the treated seawater at the third pressure at the booster pump inlet 150*a*, from the first pressure exchanger output port 142*b* of the pressure exchanger 140. The booster pump 150 is configured to elevate the pressure of the received treated seawater to the required pressure for the treated seawater to be filtered by the reverse osmosis unit 130. The method 300 further includes pumping the treated wastewater out of the booster pump outlet 150*b* to the reverse osmosis unit 130. That is, the booster pump 150 then expels the treated seawater with elevated pressure at the booster pump outlet 150*b*, into the third pipe 173, to be transferred to the second pipe 172, which in turn passes it to the reverse osmosis unit 130.

Figure 4:
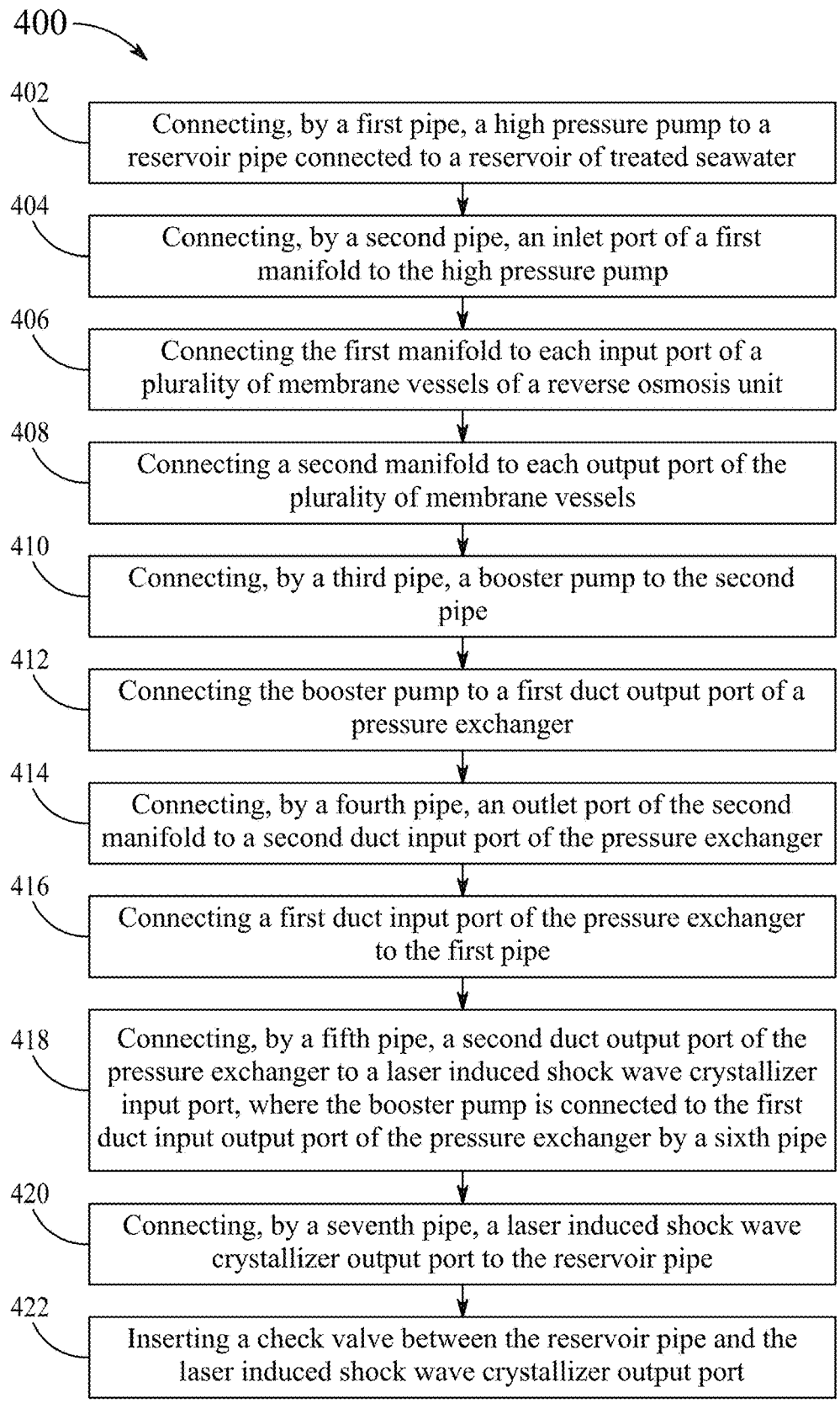
FIG. 4 is a flowchart of a method of assembling the hybrid desalination and crystallization system of FIG. 1, according to certain embodiments.

Referring to FIG. 4, a flowchart of a method 400 of assembling the system 100 is illustrated, according to certain embodiments. The method 400 is described in conjunction with FIG. 1.

At step 402, the method 400 includes connecting, by the first pipe 171, the high pressure pump 120 to the reservoir pipe 170 connected to the reservoir 110 of the treated seawater 111. That is, the reservoir pipe 170 is connected to the reservoir 110 with the first pipe 171 leading to the inlet 120*a* of the high pressure pump 120.

At step 404, the method 400 includes connecting, by the second pipe 172, the inlet port 135 of the first manifold 134 to the high pressure pump 120. That is, the first manifold 134 is connected at the inlet port 135 to the second pipe 172, which is connected to the outlet 120*b* of the high pressure pump 120.

At step 406, the method 400 includes connecting the first manifold 134 to each input port 131*a*, 132*a*, 133*a* of the plurality of membrane vessels 131, 132, 133 of the reverse osmosis unit 130. That is, the first manifold 134 is connected to the input port 131*a*, 132*a*, 133*a* of each membrane vessel 131, 132, 133 in the reverse osmosis unit 130, such that the membrane vessels 131, 132, 133 may be disposed parallel to each other.

At step 408, the method 400 includes connecting the second manifold 136 to each output port 131*c*, 132*c*, 133*c* of the plurality of membrane vessels 131, 132, 133. That is, the second manifold 136 is connected to the second output port 131*c*, 132*c*, 133*c* of each membrane vessel 131, 132, 133 in the reverse osmosis unit 130, such that the membrane vessels 131, 132, 133 may be able to expel the flow of generated second quantity of wastewater therefrom.

At step 410, the method 400 includes connecting, by the third pipe 173, the booster pump 150 to the second pipe 172. Specifically, the third pipe 173 connects the booster pump outlet 150*b* to the second pipe 172.

At step 412, the method 400 includes connecting the booster pump 150 to the first duct output port 142*b* of the pressure exchanger 140. Specifically, the booster pump 150 is connected to the first duct output port 142*b* of the pressure exchanger 140 by the sixth pipe 176.

At step 414, the method 400 includes connecting, by the fourth pipe 174, the outlet port of the second manifold 136 to the second duct input port 144*a* of the pressure exchanger 140. That is, the second manifold 136 is connected at the outlet port 137 to the fourth pipe 174, which, is connected to the pressure exchanger 140.

At step 416, the method 400 includes connecting the first duct input port 142*a* of the pressure exchanger 140 to the first pipe 171. Herein, the first pressure exchanger input port 142*a* is connected to the first pipe 171, to receive the treated wastewater.

At step 418, the method 400 includes connecting, by the fifth pipe 175, the second duct output port 144b of the pressure exchanger 140 to the laser induced shock wave crystallizer input port 160a, where the booster pump 150 is connected to the first duct output port 142b of the pressure exchanger 140 by the sixth pipe 176. That is, the fifth pipe 175 is connected between the second pressure exchanger output port 144b and the laser induced shock wave crystallizer input port 160a.

At step 420, the method 400 includes connecting, by the seventh pipe 177, the laser induced shock wave crystallizer output port 160b to the reservoir pipe 170. That is, the seventh pipe 177 is connected between the laser induced shock wave crystallizer output port 160b and the reservoir pipe 170.

At step 422, the method 400 includes inserting the check valve 180 between the reservoir pipe 170 and the laser induced shock wave crystallizer output port 160b. In particular, the check valve 180 is connected between the seventh pipe 177 and the reservoir pipe 170.

Although not specifically illustrated through blocks, in some aspects, the method 400 further includes attaching the reflective concentric mirror 164 to the outer surface 162 of the laser induced shock wave crystallizer 160. The reflective concentric mirror 164 has the central aperture. The method 400 also includes aligning the laser gun 166 with the central aperture. Such layout for the laser induced shock wave crystallizer 160 and the associated components, including the reflective concentric mirror 164 and the laser 166, may provide optimal use of laser pulses in addition to protecting optics of the laser 166 from reflected pulses.

The method 400 further includes attaching the reservoir intake port 112 including the sieve to the source of the untreated seawater 113. The method 400 also includes filling the reservoir 110 with the untreated seawater 113. Thereby, the large particles (having a diameter greater than 0.0001 microns) may be removed from the untreated seawater 113.

The method 400 further includes treating the untreated seawater 113 by injecting chemicals 115 including water softeners, acid, and anti-scalants through the chemical input port 114 to the reservoir 110, to process the untreated seawater 113 and thereby generate the treated seawater 111 for storage in the reservoir 110.

The method 400 further includes immersing the recirculating chiller 116 in the treated seawater 111. The method 400 also includes setting the recirculating chiller 116 to the temperature of 23±1° C. This is done to control the temperature of the treated seawater 111 (as stored in the reservoir 110), making it suitable for operations of the present disclosure.

Figure 5:
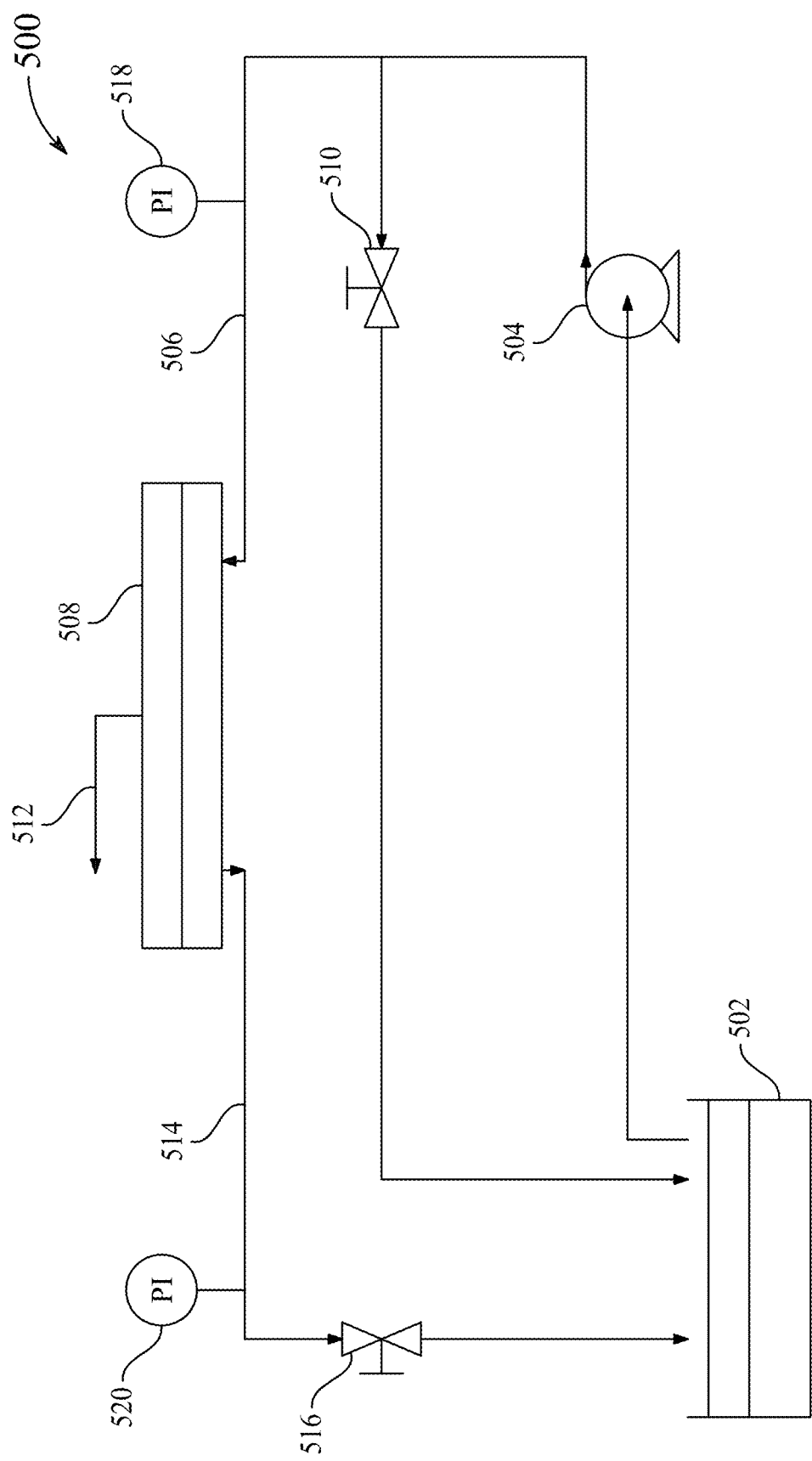
FIG. 5 is a schematic diagram of an exemplary apparatus for membrane filtration, according to certain embodiments.

FIG. 5 illustrates a schematic diagram of an exemplary apparatus 500 for membrane filtration, according to certain embodiments. The apparatus 500 provides a laboratory-scale cross-flow membrane system including various components connected to each other by Teflon and stainless steel tubes, to be used for desalination. The apparatus 500 includes a reservoir 502; a high-pressure pump 504 (for example, high-pressure pump from Wanner Engineering, Inc.) to provide a feed stream (represented by reference numeral 506); and a rectangular-shaped membrane cell 508 (for example, CF-016, Sterlitech, USA). The apparatus 500 may also include a stand-alone recirculating chiller (for example, recirculating chiller from Cole Parmer, Inc.; not shown in FIG. 5) to control the temperature of the feed water 506. The apparatus 500 may further include a bypass valve 510 to redirect excess feed water 506 back to the reservoir 502. The rectangular-shaped membrane cell 508 generates a permeate stream (represented by reference numeral 512) and a retentate stream (represented by reference numeral 514). A valve 516 is provided to control a flow of the retentate stream 514 back to the reservoir 502. The apparatus 500 may also include conductivity meters 518 and 520 (for example, HI HI9813-5N, Hanna Instruments) to measure conductivities of the feed stream 506 and the permeate stream 512 (or retentate stream 514). In some examples, the apparatus 500 may also include a microprocessor or the like (not shown) to receive measured conductivities readings from the conductivity meters 518 and 520 and calculate difference in conductivities of the feed stream 506 and the permeate stream 512.

For the purposes of the present disclosure, by implementing the apparatus 500, experiments were performed using a commercial membrane (NF90, FilmTec, USA) at 6000 ppm NaCl or MgSO4, feed pressure of 20 bars, and a temperature of 23±1° C.

The permeate flux was calculated using the formula:

$$J = \frac{V}{A \times t}$$

wherein, $J_w$ is the permeate water flux, V is the volume of collected permeate (liters) during a certain period of time t, $A_m$ is the membrane effective area (m$^2$).

Figure 6:
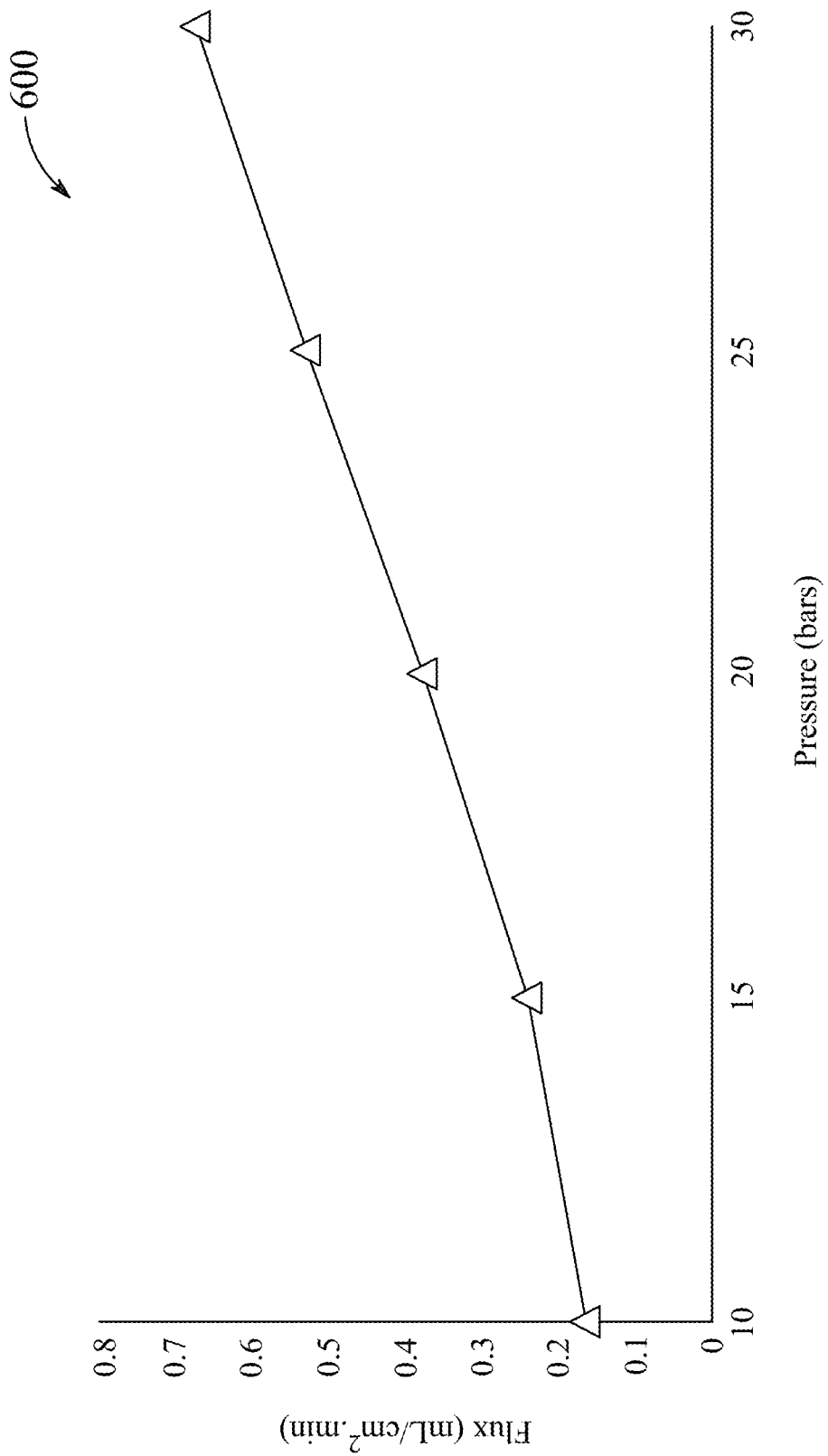
FIG. 6 is a graphical representation depicting relationship between pure water flux as a function of applied pressure for the apparatus of FIG. 5, according to certain embodiments.

For the present apparatus 500, the membrane 508 was tested for pure water permeation to detect any defect and confirm the linear response to pressure. FIG. 6 is a graphical representation 600 depicting relationship between pure water flux as a function of applied pressure for the apparatus 500 of FIG. 5, according to certain embodiments. As may be seen from FIG. 6, an excellent relationship between the permeate flux and pressure was observed for pure water permeation.

Based on the experiments, the salt rejection was 98.3% and 95.7% for NaCl and MgSO$_4$, respectively. Further, the permeate flux was 135 and 147.5 L/(h.m$^2$) for NaCl and MgSO$_4$, respectively.

Further, a laser system including mainly of the second harmonic output of a Nd: YAG pulsed laser (for example, Quanta Ray from Spectra Physics) of wavelength 532 nm at 80 mJ/pulse with 10 Hz repetition rate was employed to induce crystallization in under-saturated and saturated solutions of salt in water. The solution samples were prepared by dissolving the salt crystals in water at various saturation levels. To accelerate solute dissolvability within the solution, stirring was applied with the aid of a magnetic stirrer. The prepared solutions were then exposed to laser pulses with different exposure times starting from 1 minute, 5 minutes, and 15 minutes. Other control samples were also prepared to verify the dependence of the spontaneous crystallization (without any perturbation) on the saturation level.

Furthermore, distilled hot water was used to prepare the solutions and to ensure complete dissolvability, then filtration was performed to eliminate any pre-crystallization. The concentration of the solutions was set either above solubility level (supersaturated) or below solubility level (under-saturated). The induced crystallization in the salts solutions was mainly triggered by sound shock waves produced in the solutions by two different methods. The first method is by directly focusing the linearly polarized laser pulses into solutions for a short period of time. This setup layout was employed to cause generation of shock waves within the solution while simultaneously inducing crystallization by the direct laser light interaction with the solution. Crystallization by this method is attributed to Kerr effect where crystallization is sensitive to laser light polarization. The second crystallization method was performed by aligning the laser pulses to hit the external surface of a metallic tube container that holds the solution to avoid any photochemical effects. In both methods, the solutions saturation level and exposure time were changed to study the growth of the produced crystals. The yielded small crystals were immediately and carefully harvested, stored, and characterized using polarized light microscopy (PLM) and scanning electron microscopy (SEM) to determine the size, distribution, and morphology of the crystals.

As may be understood, in conventional crystallization, high-level saturation of the solutions is crucial in order for crystals to grow. This condition can be achieved by increasing the solute concentration so that the concentration is higher than saturation level. When the concentration is exactly at the saturation level, the solution is described to be at 100% saturation. By raising the solution temperature up to 50° C., the saturation level of the solution may be varied. Whenever the concentration of the solute reaches the metastable supersaturated level, the crystallization may either occur conventionally or by causing a shock wave perturbation by the laser.

Figure 7B:
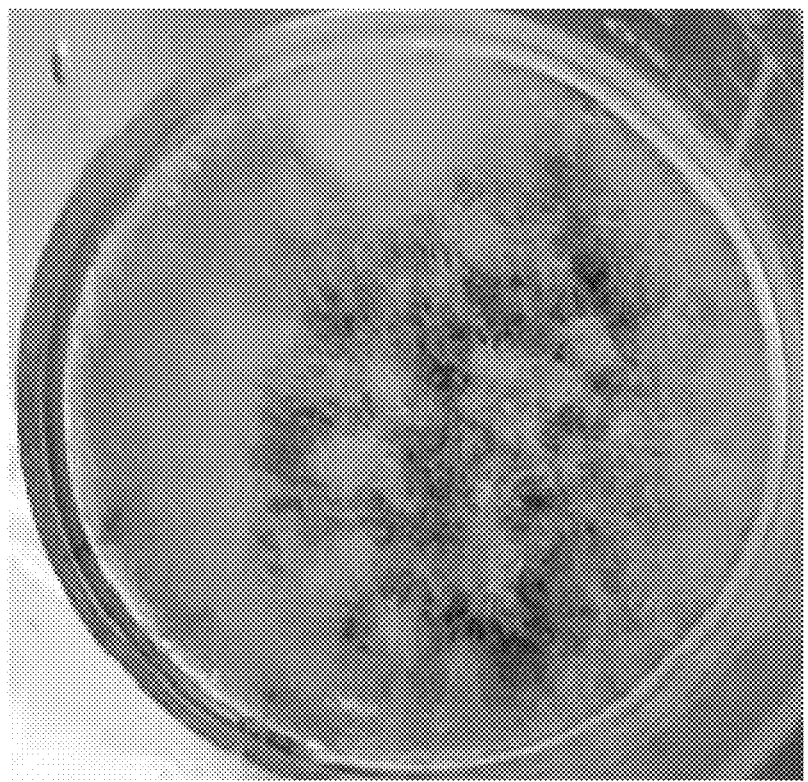
FIG. 7B is an image of salt crystals grown by laser induced crystallization technique, according to certain embodiments.
Figure 7A:
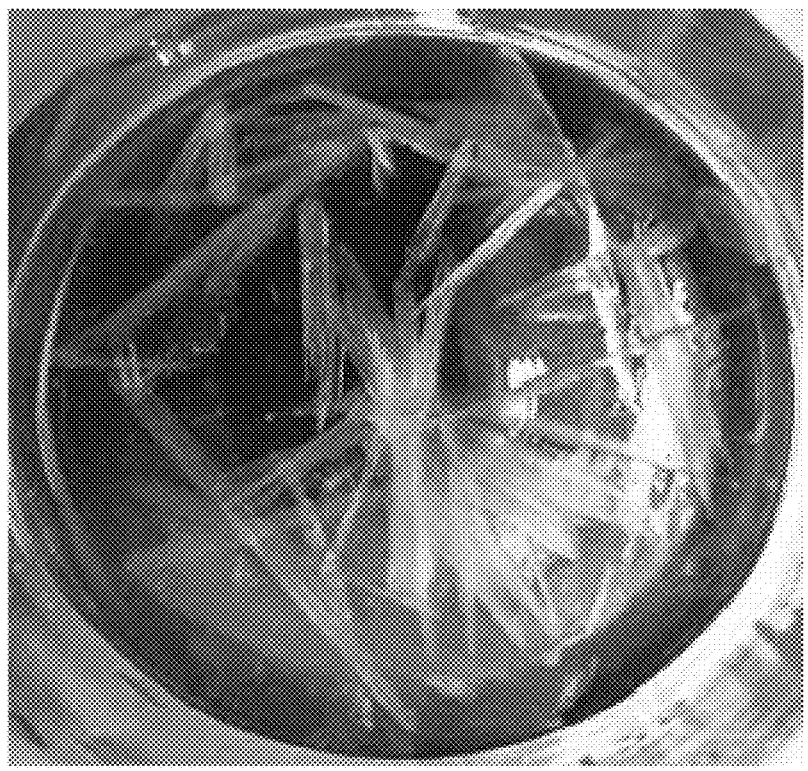
FIG. 7A is an image of salt crystals grown by a conventional crystallization technique.

FIG. 7A shows an image 700A of salt crystals produced by conventional technique and FIG. 7B shows an image 700B of salt crystals produced by laser-induced crystallization, with both solutions at the same degree of supersaturation. Both mechanisms showed visible crystallization. However, the shape and size distribution of the crystals produced by conventional technique (as in the image 700A) were clearly different from that of crystals produced by laser-induced crystallization (as in the image 700B). Furthermore, the size of crystals grown by laser (as in the image 700B) is much smaller than the crystals grown by conventional method (as in the image 700A).

This might be explained by the formation of many nucleation sites in the solution initiated by the laser shock wave at early crystallization stage and before growing the salt to bulky crystals. Further, laser-based crystallization mainly employs high-intensity laser pulses to induce crystallization. The nature of the laser-induced crystallization technique is that it generates propagation of sound shock waves, bubble formation, and local convection flow, in which it produces an impulsive force that drives the micrometer-sized target around it. This force is considered to cause a temporal and highly concentrated local area that triggers nucleation in the solution. This approach allows the formation of crystals that can grow faster compared to those obtained from conventional crystallization techniques.

Figure 8A:
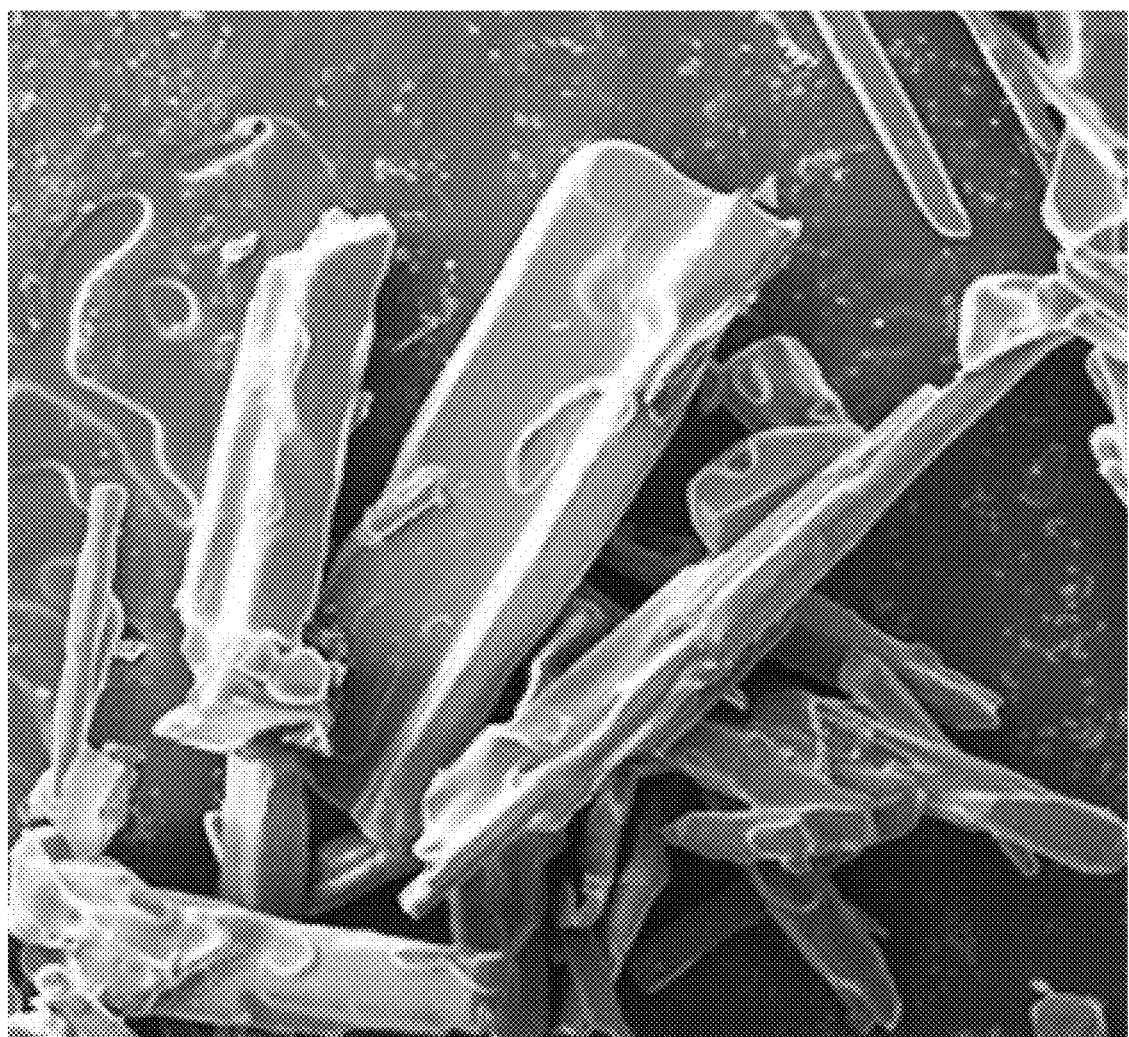
FIG. 8A is a scanning electron microscopy (SEM) image of harvested crystals grown by conventional crystallization technique.
Figure 8A:
Figure 8B:
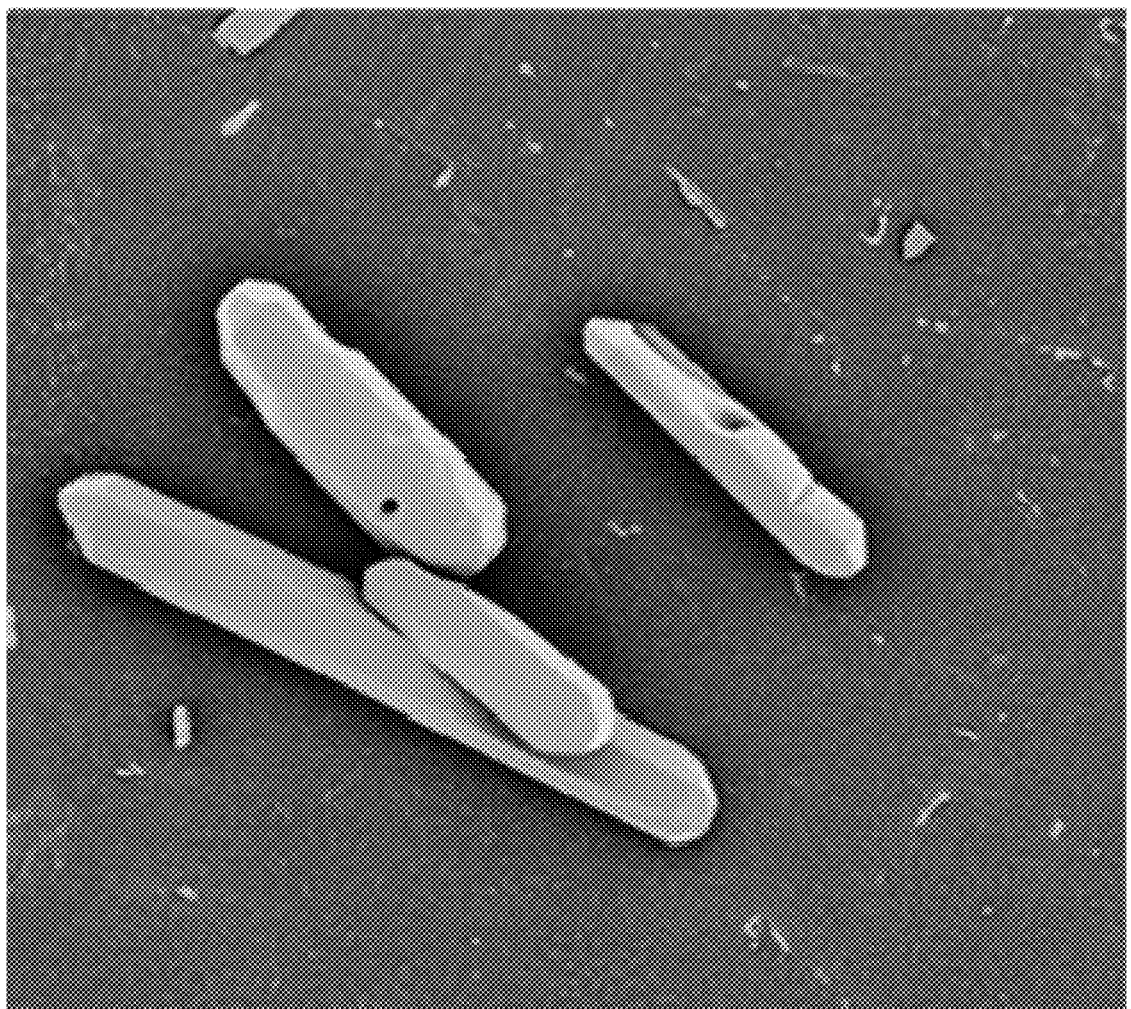
FIG. 8B is an SEM image of harvested crystals grown by direct laser induced crystallization technique, according to certain embodiments.
Figure 8C:
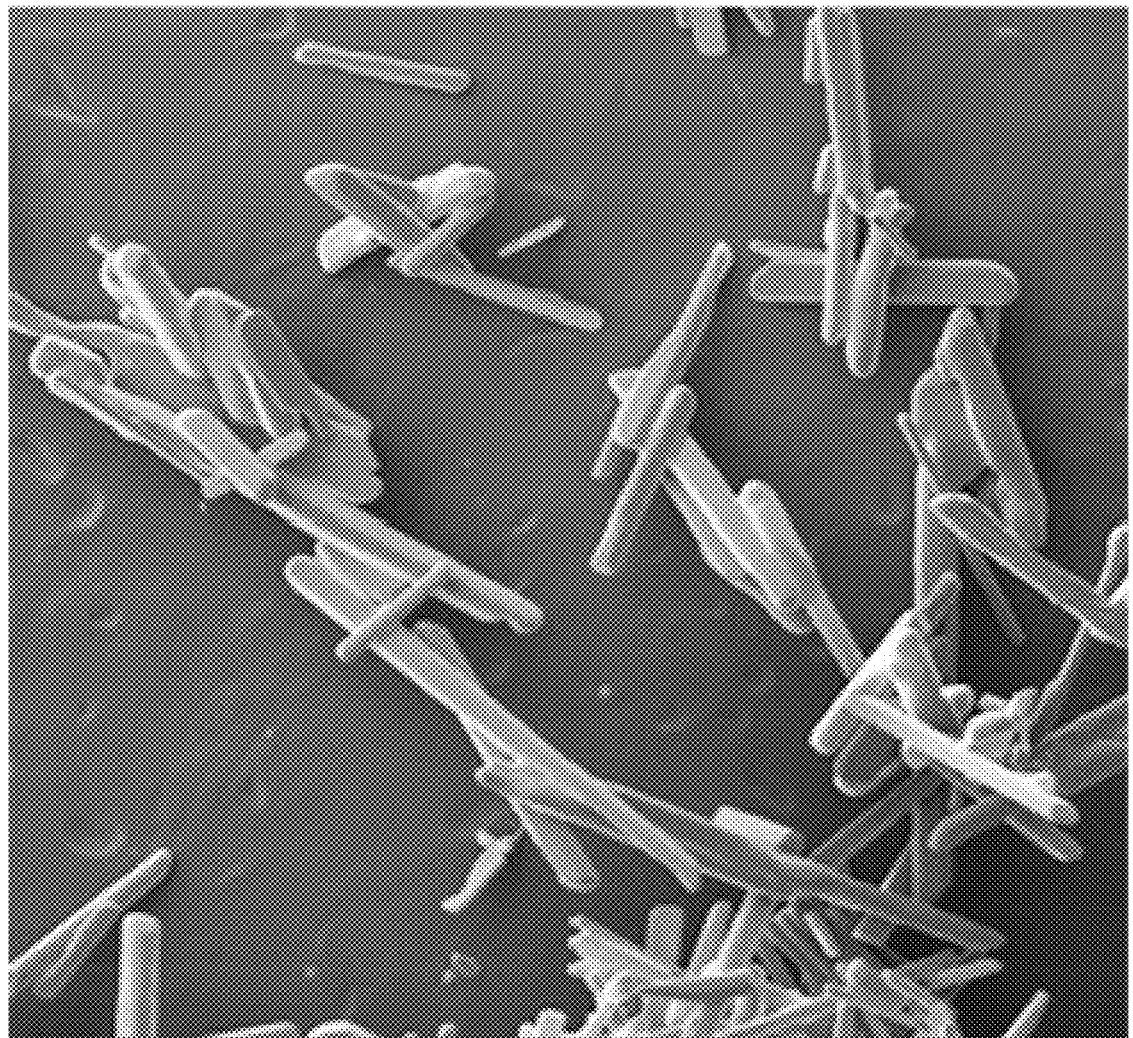
FIG. 8C is an SEM image of harvested crystals grown by photochemical free laser induced crystallization technique, according to certain embodiments.
Figure 8C:

FIG. 8A is a SEM image 800A of harvested crystals grown by a conventional crystallization technique; FIG. 8B is a SEM image 800B of harvested crystals grown by a direct laser induced crystallization technique at a high magnification; and FIG. 8C is a SEM image 800C of the harvested crystals grown by the direct free laser induced crystallization technique at a lower magnification. The SEM images 800A, 800B, 800C of the harvested crystals are presented to take a closer look at the differences in the shape and morphology of the crystals grown by different techniques. The SEM image 800A shows bulky and irregular crystalline structure with sizes approximately 900-1700×100-500 $\mu m^2$. Further, the SEM images 800B and 800C show a larger percentage of crystals having a rectangular cross section with rounded or pyramidal tips, rather than the sharp tips shown in FIG. 8A. When crystals are formed using a photochemical free laser induced shockwave, as in FIG. 8C of the present disclosure, the resulting crystals have very sharp dimensions of approximately 10 μm in width and a cylindrical cross section. In general, the studied crystals grown by laser are more uniform in size than in the conventional method even under the same condition of the solutions. This indicates that the nucleation mechanism of laser-induced shock wave crystallization is more efficient in growing crystals over short period of time.

Therefore, it may be concluded that the conventional crystallization of salt in a solution phase yielded irregular and bulky crystals of wide size distribution, whereas salts crystals grown by laser-induced shock waves were categorically smaller in size and of sharper size distribution. The crystals produced by the laser-induced shock waves technique were very sharp crystals with uniform size distribution. The laser irradiation contributed to increase the possibility of nucleation in which more nucleation sites present even in the under-saturated solutions. These nucleation sites, in turn, form critical-sized clusters and eventually grow to form many tiny crystals if the surrounding conditions adequately support this growth. Thus, the laser-induced crystallization, as implemented in the embodiments of the present disclosure, provides a fast and efficient crystallization process that can produce large salt crystals over short time.

Therefore, the system 100 and the method 300 of the present disclosure implementing the laser induced shock wave crystallization to trigger nucleation of the dissolved salts may result in more efficient process, and thus may enable the process to generate no or minimal wastewater. The system 100 and the method 300 of the present disclosure may be implemented in industrial processes (such as, in a petrochemical plant) which tend to use pure water for dilution of generated wastewater; thereby saving the pure water, reducing the operational costs, and improving the operational efficiency of such industrial processes.

Figure 9:
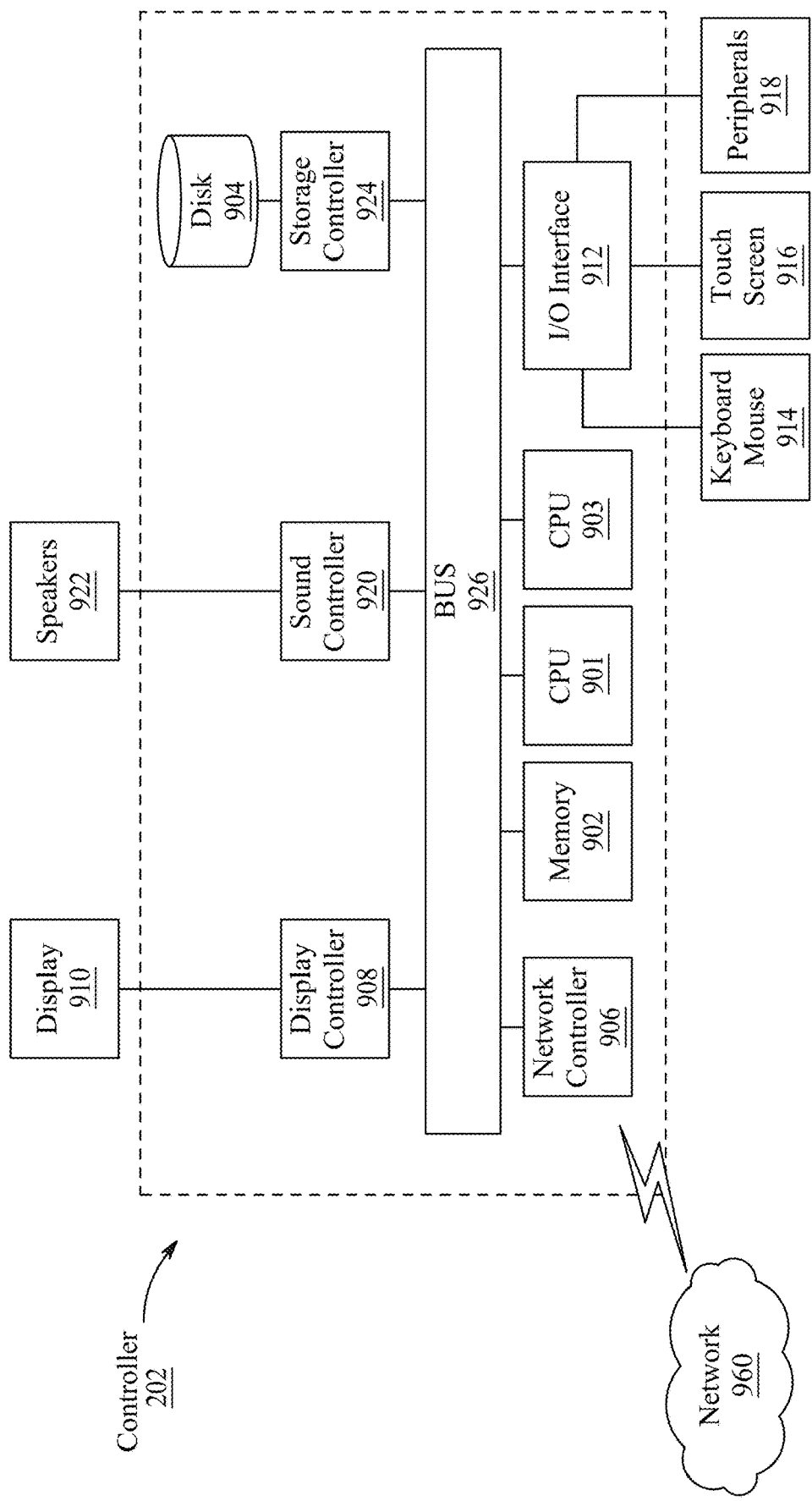
FIG. 9 is an illustration of details of computing hardware used in the computing system of FIG. 2, according to certain embodiments.

Next, details of the hardware description of the computing system 200 of FIG. 2 according to exemplary embodiments is described with reference to FIG. 9. In FIG. 9, the controller 202 described is representative of the computing system 200 of FIG. 2. The controller 202 includes a CPU 901 which performs the processes described above/below. The process data and instructions may be stored in memory 902. These processes and instructions may also be stored on a storage medium disk 904 such as a hard drive (HDD) or portable storage medium or may be stored remotely.

Further, the claims are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the controller 202 communicates, such as a server or computer.

Further, the claims may be provided as a utility application, background daemon, or component of an operating system, or combination thereof, executing in conjunction with CPU 901, 903 and an operating system such as Microsoft Windows 7, Microsoft Windows 10, UNIX, Solaris, LINUX, Apple MAC-OS, and other systems known to those skilled in the art.

The hardware elements in order to achieve the controller 202 may be realized by various circuitry elements, known to those skilled in the art. For example, CPU 901 or CPU 903 may be a Xenon or Core processor from Intel of America or an Opteron processor from AMD of America, or may be other processor types that would be recognized by one of ordinary skill in the art. Alternatively, the CPU 901, 903 may be implemented on an FPGA, ASIC, PLD or using discrete logic circuits, as one of ordinary skill in the art would recognize. Further, CPU 901, 903 may be implemented as multiple processors cooperatively working in parallel to perform the instructions of the inventive processes described above.

The controller 202 also includes a network controller 906, such as an Intel Ethernet PRO network interface card from Intel Corporation of America, for interfacing with network 960. As can be appreciated, the network 960 can be a public network, such as the Internet, or a private network such as an LAN or WAN network, or any combination thereof and can also include PSTN or ISDN sub-networks. The network 960 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The controller 202 further includes a display controller 908, such as a NVIDIA GeForce GTX or Quadro graphics adaptor from NVIDIA Corporation of America for interfacing with display 910, such as a Hewlett Packard HPL2445w LCD monitor. A general purpose I/O interface 912 interfaces with a keyboard and/or mouse 914 as well as a touch screen panel 916 on or separate from display 910. General purpose I/O interface also connects to a variety of peripherals 918 including printers and scanners, such as an OfficeJet or DeskJet from Hewlett Packard.

A sound controller 920, such as Sound Blaster X-Fi Titanium from Creative, is also provided in the controller 202 to interface with speakers/microphone 922 thereby providing sounds and/or music.

The general purpose storage controller 924 connects the storage medium disk 904 with communication bus 926, which may be an ISA, EISA, VESA, PCI, or similar, for interconnecting all of the components of the computing device. A description of the general features and functionality of the display 910, keyboard and/or mouse 914, as well as the display controller 908, storage controller 924, network controller 906, sound controller 920, and general purpose I/O interface 912 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

Obviously, numerous modifications and variations of the present disclosure are possible in light of the above teachings. It is therefore to be understood that within the scope of the appended claims, the invention may be practiced otherwise than as specifically described herein.

The invention claimed is:

1. A hybrid desalination and crystallization system for purifying seawater, comprising:
    a reverse osmosis unit configured to separate the seawater from dissolved solids, generate a first quantity of purified water, and generate a second quantity of wastewater having a first concentration of dissolved salts;
    a pressure exchanger configured to lower a pressure of the second quantity of wastewater to atmospheric pressure;
    a laser induced shock wave crystallizer configured to trigger nucleation of the dissolved salts in the second quantity of wastewater, expel a third quantity of wastewater having a second concentration of dissolved salts, and expel a fourth quantity of salt crystals, wherein the second concentration is less than the first concentration;
    a collection vat for receiving the salt crystals; and
    a high pressure pump configured to recycle the third quantity of wastewater back to the reverse osmosis unit.

2. The hybrid desalination and crystallization system of claim 1, further comprising:
    a reservoir of treated seawater; and
    a reservoir pipe configured to connect the reservoir with a first pipe leading to an inlet of the high pressure pump.

3. The hybrid desalination and crystallization system of claim 2, further comprising:
    at least three membrane vessels located in the reverse osmosis unit, each membrane vessel having an input port, a first output port configured to expel the first quantity of purified water, and a second output port configured to expel the second quantity of wastewater having the first concentration of dissolved salts;
    a first manifold connected to a second pipe connected to an outlet of the high pressure pump and to the input port of each membrane vessel; and
    a second manifold connected to the second output port of each membrane vessel.

4. The hybrid desalination and crystallization system of claim 3, further comprising:
    a booster pump connected to the pressure exchanger, the booster pump having a booster pump inlet and a booster pump outlet; and
    a third pipe configured to connect the booster pump outlet to the second pipe.

5. The hybrid desalination and crystallization system of claim 4, further comprising:
    a first pressure exchanger input port connected to the first pipe, a second pressure exchanger input port connected to a fourth pipe connected to the second manifold, a first pressure exchanger output port and a second pressure exchanger output port;

a fifth pipe connected between the second pressure exchanger output port and a laser induced shock wave crystallizer input port;

a sixth pipe connected between the booster pump inlet and the first pressure exchanger output port; and a seventh pipe connected to an output port of the laser induced shock wave crystallizer.

6. The hybrid desalination and crystallization system of claim 5, further comprising:

a check valve connected between the seventh pipe and the reservoir pipe, the check valve configured to prevent the treated seawater in the reservoir pipe from flowing into the seventh pipe.

7. The hybrid desalination and crystallization system of claim 6, further comprising:

a first pressure in the first pipe;

a second pressure in the fourth pipe, wherein the second pressure is greater than the first pressure;

a first duct in the pressure exchanger connected between the first pressure exchanger input port and the first pressure exchanger output port, wherein the pressure exchanger is configured to receive the treated seawater at the first pressure at the first pressure exchanger input port from the first pipe, and expel the treated seawater at a third pressure from the first pressure exchanger output port; and a second duct in the pressure exchanger connected between the second pressure exchanger input port and the second pressure exchanger output port, wherein the pressure exchanger is configured to receive the second quantity of wastewater at the second pressure at the second pressure exchanger input port from the fourth pipe and expel the second quantity of wastewater at atmospheric pressure at the second pressure exchanger output port, wherein the first duct is parallel to the second duct.

8. The hybrid desalination and crystallization system of claim 7, further comprising:

a reservoir intake port configured to receive untreated seawater, the reservoir intake port including a sieve configured to remove large particles from the untreated seawater, wherein the large particles have a diameter greater than 0.0001 microns;

a chemical input port configured to inject chemicals including water softeners, acid, and anti-scalants into the untreated seawater in the reservoir to generate the treated seawater; and a recirculating chiller configured to control the temperature of the treated seawater to 23±1° C.

9. The hybrid desalination and crystallization system of claim 8, further comprising:

a laser configured to emit pulses of coherent light;

a reflective concentric mirror located on an outer surface of the laser induced shock wave crystallizer, the reflective concentric mirror having a central aperture, wherein the central aperture is configured to collimate coherent light entering the central aperture, and wherein the pulses of coherent light generate acoustic shock waves in the second quantity of concentrated wastewater, wherein the acoustic shock waves trigger nucleation of salt in the concentrated wastewater.

10. A method for hybrid desalination and crystallization of seawater, the method comprising:

receiving treated seawater at an inlet port of a first manifold connected to input ports of a reverse osmosis unit, wherein the treated seawater is at a first pressure;

separating, by the reverse osmosis unit, the treated seawater into a first quantity of purified water and a second quantity of wastewater having a first concentration of dissolved salts;

expelling the second quantity of wastewater at a second pressure from an outlet port of a second manifold connected to output ports of the reverse osmosis unit, wherein the second pressure is lower than the first pressure;

receiving the second quantity of wastewater at a pressure exchanger;

reducing the second pressure to atmospheric pressure in the pressure exchanger and inputting the second quantity of wastewater to a laser induced shock wave crystallizer;

crystallizing the first concentration of dissolved salts in the laser induced shock wave crystallizer and generating a third quantity of wastewater having a second concentration of dissolved salts and a fourth quantity of salt crystals, wherein the second concentration is less than the first concentration;

collecting the salt crystals in a collection vat;

recycling the third quantity of wastewater to the reverse osmosis unit.

11. The method of claim 10, further comprising:

receiving untreated seawater through a reservoir intake port;

removing, by a sieve, large particles from the untreated seawater, wherein the large particles have a diameter greater than 0.0001 microns;

injecting chemicals including water softeners, acid, and anti-scalants into the untreated seawater in the reservoir to generate the treated seawater; and controlling, by a recirculating chiller, the temperature of the treated seawater to 23±1° C.

12. The method of claim 11, further comprising:

pumping, by a high pressure pump, the treated seawater from the reservoir to the first manifold.

13. The method of claim 10, further comprising:

reducing the second pressure to atmospheric pressure in the pressure exchanger by:
injecting the treated seawater into a first duct of the pressure exchanger;
injecting the second quantity of wastewater into a second duct of the pressure exchanger, wherein the second duct is parallel to the first duct; and
rotating the first duct and the second duct to transfer energy from the second duct to the first duct.

14. The method of claim 13, further comprising:

receiving the treated wastewater at a booster pump inlet connected to the pressure exchanger; and pumping the treated wastewater out of a booster pump outlet to the reverse osmosis unit.

15. The method of claim 10, further comprising:

emitting, by a laser, pulses of coherent light;

collimating, by a reflective concentric mirror located on an outer surface of the laser induced shock wave crystallizer, the reflective concentric mirror having a central aperture, the pulses of coherent light;

generating acoustic shock waves in the second quantity of concentrated wastewater by internal reflection of the pulses of coherent light between the outer surface of the laser induced shock wave crystallizer and the reflective concentric mirror; and triggering nucleation of salt crystals by the acoustic shock waves.

16. A method of assembling a hybrid desalination and crystallization system, the method comprising:
connecting, by a first pipe, a high pressure pump to a reservoir pipe connected to a reservoir of treated seawater;
connecting, by a second pipe, an inlet port of a first manifold to the high pressure pump;
connecting the first manifold to each input port of a plurality of membrane vessels of a reverse osmosis unit;
connecting a second manifold to each output port of the plurality of membrane vessels;
connecting, by a third pipe, a booster pump to the second pipe;
connecting the booster pump to a first duct output port of a pressure exchanger;
connecting, by a fourth pipe, an outlet port of the second manifold to a second duct input port of the pressure exchanger;
connecting a first duct input port of the pressure exchanger to the first pipe;
connecting, by a fifth pipe, a second duct output port of the pressure exchanger to a laser induced shock wave crystallizer input port,
wherein the booster pump is connected to the first duct output port of the pressure exchanger by a sixth pipe;
connecting, by a seventh pipe, a laser induced shock wave crystallizer output port to the reservoir pipe; and
inserting a check valve between the reservoir pipe and the laser induced shock wave crystallizer output port.

17. The method of claim 16, further comprising:
attaching a reflective concentric mirror to an outer surface of the laser induced shock wave crystallizer, the reflective concentric mirror having a central aperture; and
aligning a laser gun with the central aperture.

18. The method of claim 16, further comprising:
attaching a reservoir intake port including a sieve to a source of untreated seawater; and
filling the reservoir with the untreated seawater.

19. The method of claim 18, further comprising:
treating the untreated seawater by injecting chemicals including water softeners, acid, and anti-scalants through a chemical input port to the reservoir.

20. The method of claim 19, further comprising:
immersing a recirculating chiller in the treated seawater; and
setting the recirculating chiller to a temperature of $23\pm1°$ C.

* * * * *